(12) United States Patent  
Mathew et al.

(10) Patent No.: US 11,456,877 B2  
(45) Date of Patent: Sep. 27, 2022

(54) UNIFIED ACCELERATOR FOR CLASSICAL AND POST-QUANTUM DIGITAL SIGNATURE SCHEMES IN COMPUTING ENVIRONMENTS

(71) Applicant: Intel Corporation, Santa Clara, CA (US)

(72) Inventors: Sanu Mathew, Portland, OR (US); Manoj Sastry, Portland, OR (US); Santosh Ghosh, Hillsboro, OR (US); Vikram Suresh, Portland, OR (US); Andrew H. Reinders, Portland, OR (US); Raghavan Kumar, Hillsboro, OR (US); Rafael Misoczki, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 308 days.

(21) Appl. No.: 16/456,187

(22) Filed: Jun. 28, 2019

(65) Prior Publication Data

US 2019/0319804 A1  Oct. 17, 2019

(51) Int. Cl.  
*H04L 29/06* (2006.01)  
*H04L 9/32* (2006.01)  
(Continued)

(52) U.S. Cl.  
CPC ............ *H04L 9/3247* (2013.01); *G06F 21/76* (2013.01); *H04L 9/0869* (2013.01); *H04L 9/3239* (2013.01); *H04L 2209/38* (2013.01)

(58) Field of Classification Search  
CPC ... H04L 9/3247; H04L 9/0869; H04L 9/3239; H04L 2209/38; H04L 2209/122;  
(Continued)

(56) References Cited

U.S. PATENT DOCUMENTS 6,748,410 B1 *  6/2004  Gressel .................. G06F 7/728  
                                                708/491  
6,901,509 B1 *  5/2005  Kocher ................. H04L 9/3236  
                                                713/176  
(Continued)

FOREIGN PATENT DOCUMENTS

CN      112152809 A    12/2020  
EP       3758289 A1    12/2020

OTHER PUBLICATIONS

Blaauwendraad, "Post-quantum Hash-based Signatures for Multi-chain Blockchain Technologies", May 2018 (Year: 2018).*

(Continued)

*Primary Examiner* — Jorge L Ortiz Criado  
*Assistant Examiner* — Hassan A Hussein  
(74) *Attorney, Agent, or Firm* — Jaffery Watson Mendonsa & Hamilton LLP

(57) ABSTRACT

A mechanism is described for facilitating unified accelerator for classical and post-quantum digital signature schemes in computing environments. A method includes unifying classical cryptography and post-quantum cryptography through a unified hardware accelerator hosted by a trusted platform of the computing device. The method may further include facilitating unification of a first finite state machine associated with the classical cryptography and a second finite state machine associated with the post-quantum cryptography though one or more of a single the hash engine, a set of register file banks, and a modular exponentiation engine.

11 Claims, 15 Drawing Sheets

⌠ 100

One-Time Hash-Based Signatures 1 signing key          1 signature          1 verification key A private key must only sign a single message

(51) Int. Cl.
*G06F 21/76* (2013.01)
*H04L 9/08* (2006.01)
(58) Field of Classification Search
CPC ....... H04L 9/14; H04L 9/0643; H04L 9/0825; H04L 9/0852; G06F 21/76; G06F 21/602; G06F 21/64
See application file for complete search history.

(56) References Cited

U.S. PATENT DOCUMENTS

| | | | | |
|---|---|---|---|---|
| 6,920,562 | B1* | 7/2005 | Kerr | G06F 21/72 712/18 |
| 7,716,179 | B1* | 5/2010 | Agapiev | H04L 67/1076 707/706 |
| 10,699,016 | B2* | 6/2020 | Kim | G06F 9/4498 |
| 11,005,664 | B2* | 5/2021 | Chalkias | G06N 10/00 |
| 2004/0143710 | A1* | 7/2004 | Walmsley | G06F 21/575 711/144 |
| 2005/0089160 | A1* | 4/2005 | Crispin | G06F 9/3895 712/E9.032 |
| 2011/0013768 | A1* | 1/2011 | Lambert | H04L 9/30 380/28 |
| 2013/0198530 | A1* | 8/2013 | Wang | G09C 1/00 713/190 |
| 2016/0099811 | A1* | 4/2016 | Hawblitzel | H04L 63/0823 713/176 |
| 2017/0063814 | A1* | 3/2017 | Wachs | H04L 9/0631 |
| 2017/0083314 | A1* | 3/2017 | Burger | G06F 9/528 |
| 2017/0134163 | A1* | 5/2017 | Suresh | G06F 9/3895 |
| 2017/0220499 | A1* | 8/2017 | Gray | G06F 13/36 |
| 2018/0091309 | A1* | 3/2018 | Misoczki | H04L 9/3252 |
| 2018/0225116 | A1* | 8/2018 | Henry | G06N 3/04 |
| 2019/0042475 | A1* | 2/2019 | Ghosh | H04L 9/0643 |
| 2019/0140819 | A1* | 5/2019 | Dolev | H04L 9/321 |
| 2019/0229901 | A1* | 7/2019 | Elbaz | H04L 9/083 |
| 2019/0319782 | A1* | 10/2019 | Ghosh | H04L 9/3239 |
| 2019/0319787 | A1* | 10/2019 | Reinders | G06F 7/724 |
| 2019/0319797 | A1* | 10/2019 | Suresh | H04L 9/3247 |
| 2019/0319801 | A1* | 10/2019 | Sastry | H04L 9/0894 |
| 2019/0325166 | A1* | 10/2019 | Suresh | H04L 9/3239 |
| 2019/0386815 | A1* | 12/2019 | Satpathy | G06F 7/724 |
| 2020/0265167 | A1* | 8/2020 | Banerjee | H04L 9/3093 |
| 2020/0310992 | A1* | 10/2020 | Cook | G06F 12/0607 |
| 2020/0394336 | A1* | 12/2020 | Wenger | G06F 21/602 |
| 2020/0403978 | A1* | 12/2020 | Allen | H04L 63/205 |
| 2021/0141697 | A1* | 5/2021 | Chin | G06F 13/4282 |

OTHER PUBLICATIONS

Albrecht, Implementing RLWE-based Schemes Using an RSA Co-Processor, 2018 (Year: 2018).*
Extended European Search Report for EP Application No. 20164848.2 dated Jul. 31, 2020, 9 pages.
Khan, et al., "An FPGA Design of a Unified Hash Engine for IPSec Authentication". System-On-Chip for Real Time Applications, 2005. Proceedings. Fifth International Workshop on Banff, AB, Canada Jul. 20-24, 2005, Piscataway, NJ, IEEE, Jul. 20, 2005, pp. 450-453, XP010851988.
Khan, et al., "A Reconfigurable Hardware Unit for the HMAC Algorithm", Information and Communications Technology, 2005. Enabling Technologies for the New Knowledge Society: ITI 3rd International Conference on Cairo, Egypt 05 Dec. 2005. Piscataway, NJ, IEEE Dec. 5, 2005, pp. 861-874, XP010911111.
Sagisi, Joseph, et al., "System Architectural Design of a Hardware Engine for Moving Target IPv6 defense over IEEE 802.3 Ethernet", MILCOM 2017-2017 IEEE Military Communications Conference (MILCOM), IEEE, Oct. 23, 2017, pp. 551-556, XP033265095.
Huelsing, et al., "XMSS extended Merkle Signature Scheme", rfc8391.txt, Internet Engineering Task Force, IETF; Standard, Internet Society, (ISOC) 4, Rue Des Falaises Ch-1205 Geneva, Switzerland, Jun. 1, 2018, pp. 1-74, XP015126339.
Anhoa, Noah, "Bitcoin Post-Quantum", Jan. 1, 2018, XP055715020, Retrieved from the Internet: URL:https://pdfs.semanticscholar.org/0665/blef9ddef351205192033ebe09b6cce9fbfb3.pdf?ga=2.

* cited by examiner

One-Time Hash-Based Signatures

A private key must only sign a single message

Multi-Time Hash-Based Signatures

A private key can sign multiple messages

WOTS One-Time Signature Scheme
Message is hashed and parsed into M:67 integers between [0,1,2,...15]

205 — Public Key pk: 67 components of 32-bytes each

210 — Signature s: 67 components of 32-bytes each

215 — Public Key pk: 67 components of 32-bytes each

UNIFIED ACCELERATOR FOR CLASSICAL AND POST-QUANTUM DIGITAL SIGNATURE SCHEMES IN COMPUTING ENVIRONMENTS

FIELD

Embodiments described herein relate generally to data processing and more particularly to facilitating unified accelerator for classical and post-quantum digital signature schemes in computing environments.

BACKGROUND

Existing public-key digital signature algorithms are vulnerable to certain attacks, such as those using quantum computers. Efforts are underway to develop standards for algorithms that are secure against both classical and post-quantum attacks, but these proposals employ separate hardware accelerators that require large memory and physical space and are inefficient in that they require separate compute (e.g., hash-engines) and memory macros (e.g., register files) to enable any of the signature schemes.

Further, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1A:
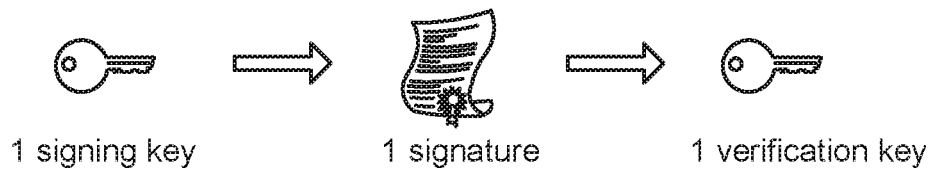
FIGS. 1A and 1B illustrate a one-time hash-based signatures scheme and a multi-time hash-based signatures scheme, respectively.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for novel technique for employing a unified hardware accelerator (UHA) for facilitating security measures for classical and/or post-quantum signature schemes by, for example, sharing datapaths and memory blocks of a classical signature scheme with a post-quantum signature scheme. For example, a hash engine in an RSA-based scheme is tweaked to extend support for performing eXtended Merkle Signature Scheme (XMSS) hash operations, while a memory block is reused across both the signature schemes. The hash engine may be operated in one of the two modes based on a simple input bit that may then be programmed by a user or an application. Accordingly, subject matter described herein addresses these are other issues by providing systems and methods to implement a unified hardware accelerator that offers security against both classical and post-quantum computing attacks.

XMSS is a hash-based signature scheme using a Winternitz one-time signatures (WOTS), a one-time signature scheme, in combination with SHA2-256 as the primary underlying hash function. User of XMSS may also use SHA2-512, SHA3-SHAKE-256 or SHA3-SHAKE-512 as optional hash functions. Some XMSS implementations employ a generic SHA2-256 hash module to perform the XMSS specific hash functions such as Pseudo-Random Function (PRF), chain hash (F), tree hash (H) and message hash (H_msg). LMS is a hash-based signature scheme using Leighton/Micali one-time signatures (LM_OTS) as the one-time signature building block, which is based on SHA2-256 hash function.

Post-Quantum Cryptography

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Shor, P. W. "Algorithms for quantum computation: discrete logarithms and factoring". Proceedings 35th Annual Symposium on Foundations of Computer Science. IEEE Compute. Soc. Press. doi:10.1109/sfcs.1994.365700. ISBN 0818665807. Although any post-quantum cryptography could be built on the current cryptography, the novel approach would need to be intelligent, fast, and precise enough to resist and defeat any attacks by quantum computers.

Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's Hidden Field Equation (HFE) public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance, such as hash-based signatures (HBS).

Figure 1B:
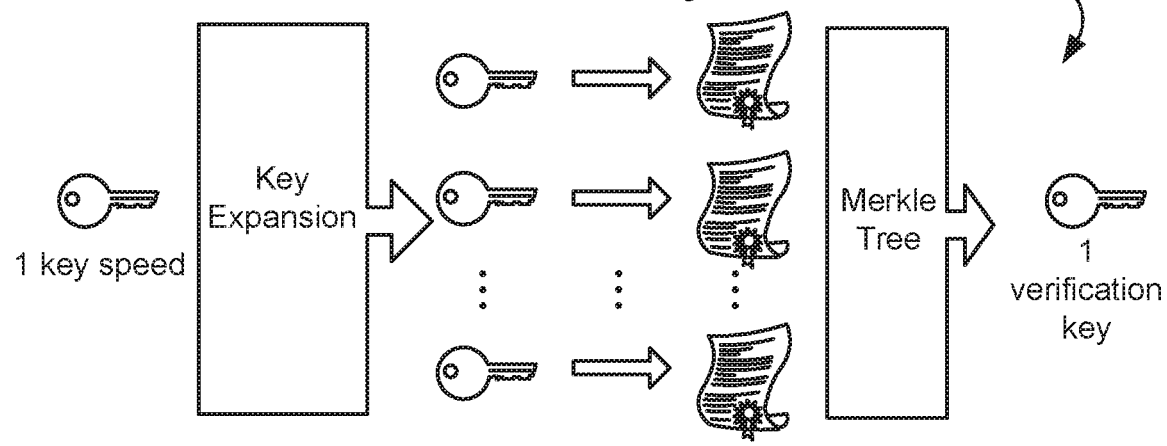

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), SPHINCS scheme, SPHINCS+ scheme, etc. With the advent of quantum computing and in anticipation of its growth, there have been concerns about various challenges that quantum computing could pose and what could be done to counter such challenges using the area of cryptography One area that is being explored to counter quantum computing challenges is hash-based signatures (HBS) since these schemes have been around for a long while and possess the necessary basic ingredients, such as relying on symmetric cryptography building blocks (e.g., hash functions), to counter the quantum counting and post-quantum computing challenges. HBS schemes are regarded as fast signature algorithms working with fast platform secured-boot, which is regarded as the most resistant to quantum attacks For example, as illustrated with respect to FIG. 1A, a scheme of HBS is shown that uses Merkle trees along with one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a signing key can sign multiple messages.

Figure 2A:
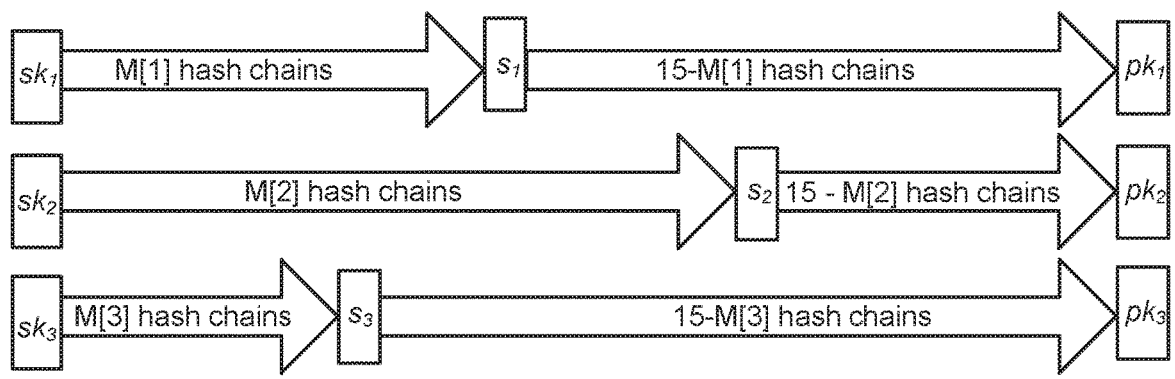
FIGS. 2A and 2B illustrate a one-time signature scheme and a multi-time signature scheme, respectively.
Figure 2A:
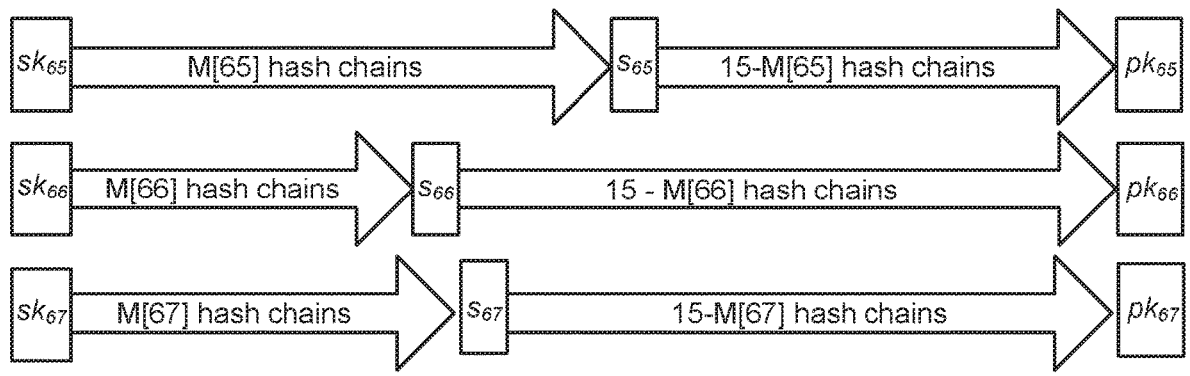
Figure 2B:
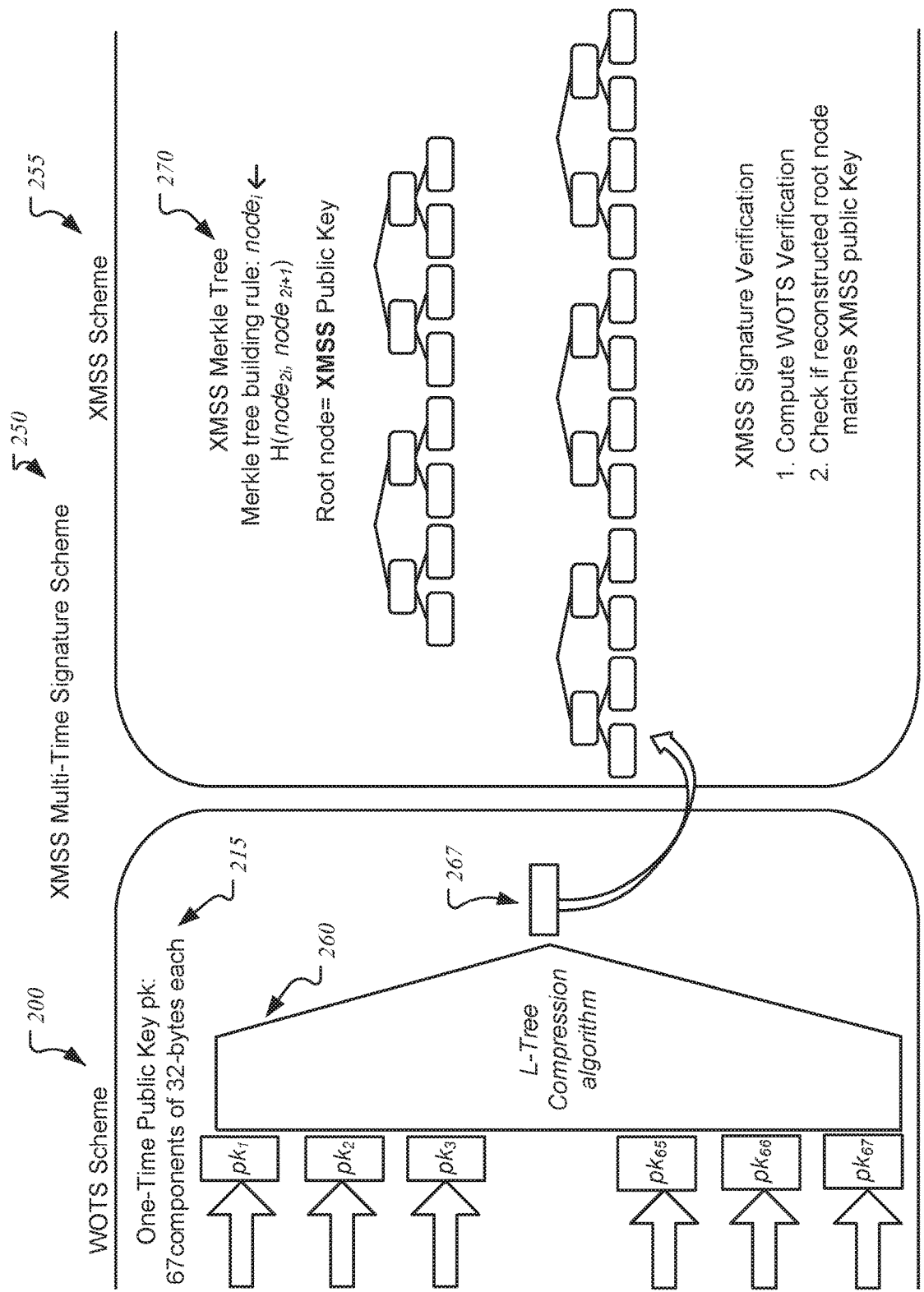

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS (WOTS) scheme 200, which was offered by Robert Winternitz of Stanford Mathematics Department, while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each Now, for example, FIG. 2B illustrates XMSS MTS scheme 250 that allows for a combination of WOTS scheme 200 of FIG. 2A and XMSS scheme 255 having XMSS Merkle tree 270. As discussed previously with respect to FIG. 2A, WOTS scheme 200 is based on a one-time public key, pk, 205, having 67 components of 32 bytes each, that is then put through L-Tree compression algorithm 260 to offer WOTS compressed pk 267 to take a place in the XMSS Merkle tree 270 of XMSS scheme 255. It is contemplated that XMSS signature verification may include computing WOTS verification and checking to determine whether a reconstructed root node matches the XMSS public key, such as root node=XMSS public key.

Accelerators for Post-Quantum Cryptography

Figure 7:
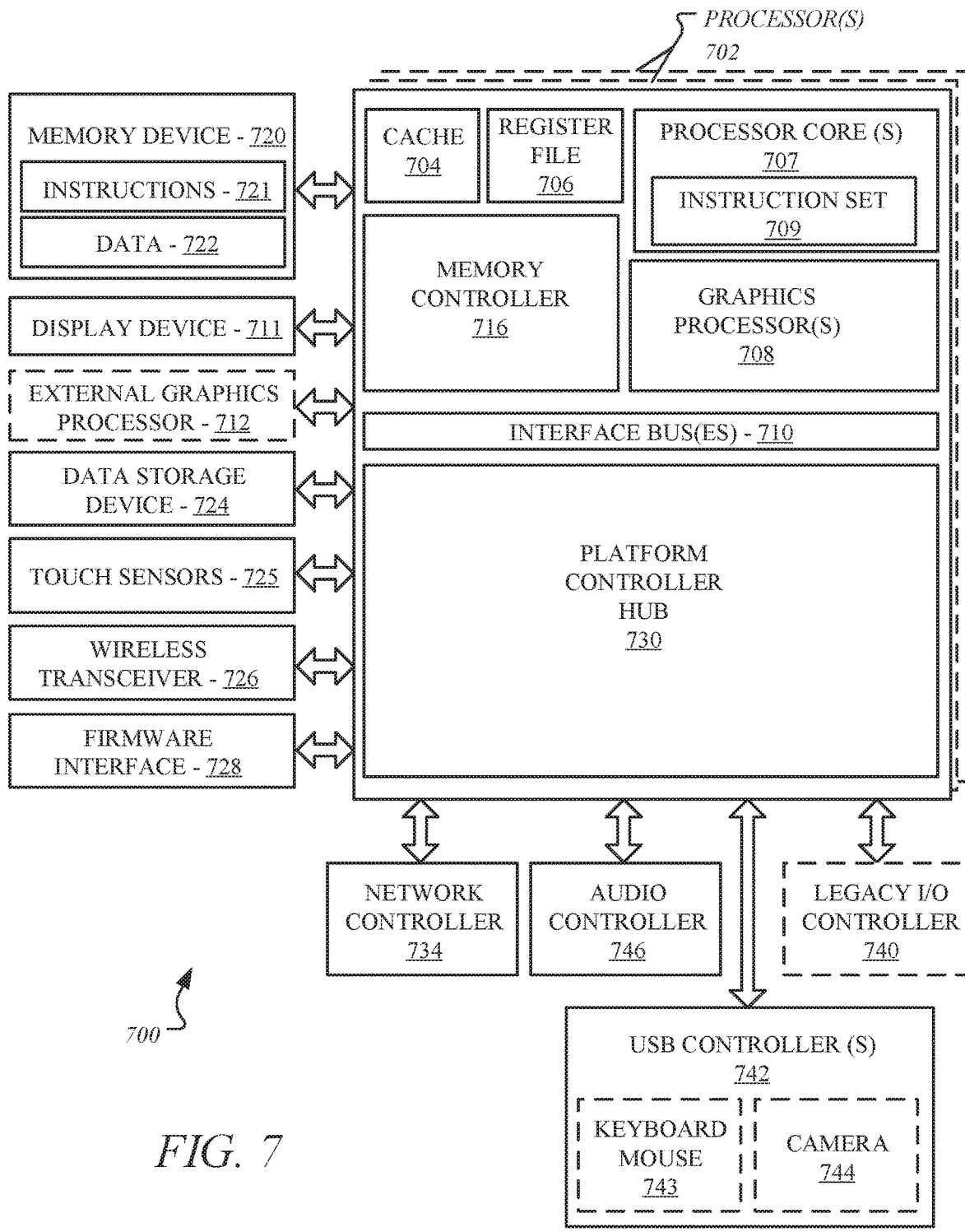
FIG. 7 illustrates an embodiment of an exemplary computing architecture that may be suitable for implementing various embodiments in accordance with some examples.
Figure 8:
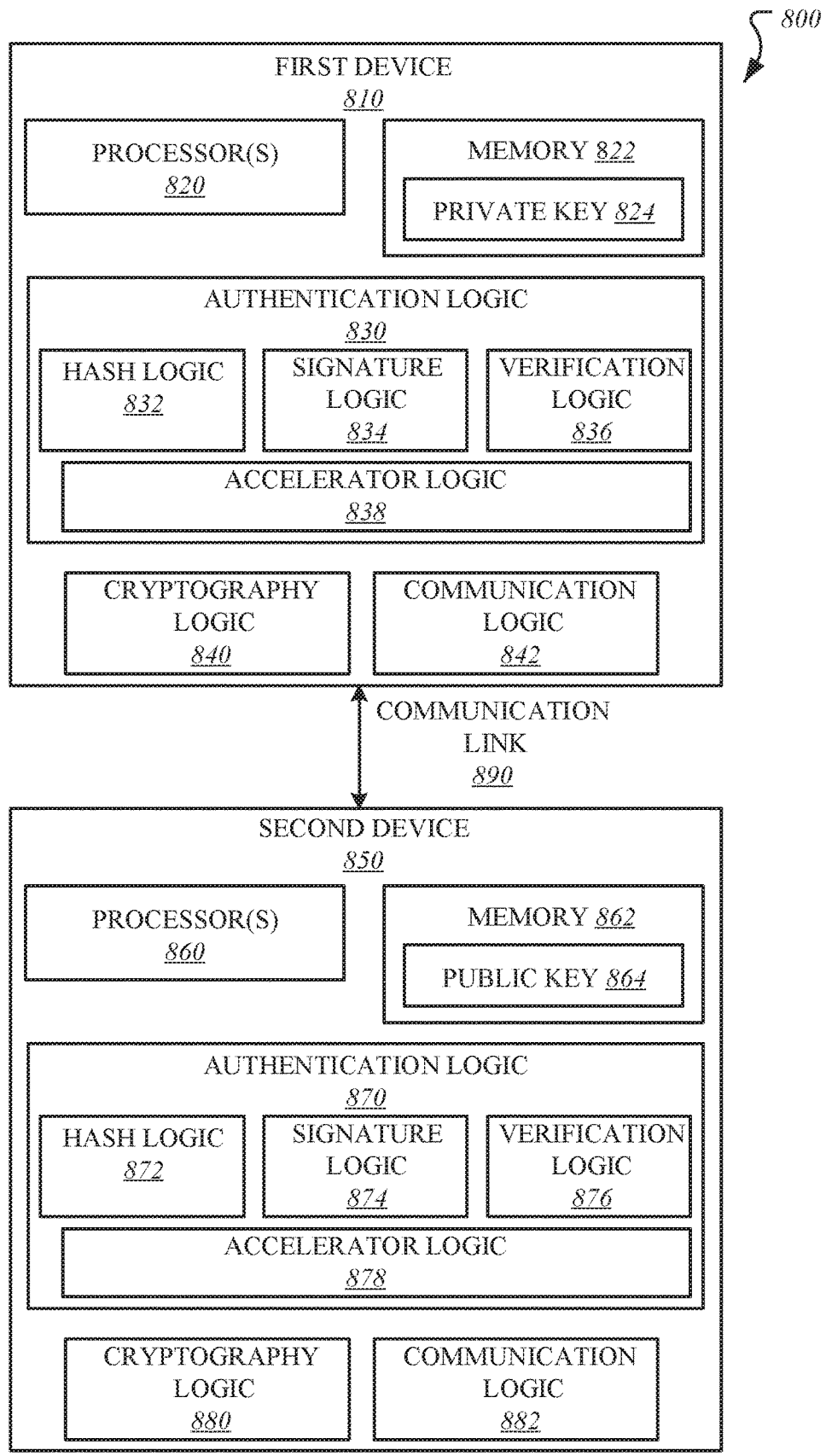
FIG. 8 illustrates a high-level architecture of a secure environment that includes a first device and a second device in accordance with some examples.

Referring to FIG. 8, it illustrates a high-level architecture of a secure environment 800 that includes a first device 810 and a second device 850, in accordance with some examples. Referring to FIG. 8, each of the first device 810 and the second device 850 may be embodied as any type of computing device capable of performing the functions described herein, such as computing device 800 of FIG. 8, computing device 700 of FIG. 7, etc. For example, in some embodiments, each of the first device 810 and the second device 850 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 810 includes one or more processor(s) 820 and a memory 822 to store a private key 824. The processor(s) 820 may be embodied as any type of processor capable of performing the functions described herein. For example, the processor(s) 820 may be embodied as a single or multi-core processor(s), digital signal processor, microcontroller, or other processor or processing/controlling circuit. Similarly, the memory 822 may be embodied as any type of volatile or non-volatile memory or data storage capable of performing the functions described herein. In operation, the memory 822 may store various data and software used during operation of the first device 810 such as operating systems, applications, programs, libraries, and drivers. The memory 822 is communicatively coupled to the processor(s) 820. In some examples the private key 824 may reside in a secure memory that may be part memory 822 or may be separate from memory 822.

First device 810 further comprises authentication logic 830 which includes memory 862, signature logic, and verification logic 836. Hash logic 832 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 834 may be configured to generate a signature to be transmitted, i.e., a transmitted signature and/or to verify a signature. In instances in which the first device 810 is the signing device, the transmitted signature may include a number, L, of transmitted signature elements with each transmitted signature element corresponding to a respective message element. For example, for each message element, $m_i$, signature logic 834 may be configured to perform a selected signature operation on each private key element, $s_{ki}$ of the private key, $s_k$, a respective number of times related to a value of each message element, $m_i$ included in the message representative m'. For example, signature logic 834 may be configured to apply a selected hash function to a corresponding private key element, $s_{ki}$, $m_i$ times. In another example, signature logic 834 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) published Requests for Comments (RFC) such as RFC 8391, entitled SMSS: eXtended Merkel Signature Scheme released May 2018.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or N-$m_i$ times to generate a signature and to apply the hash function to each received message element N-$m_i$, or $m_i$, times to generate a corresponding verification signature element. The Merkle many time signature scheme is a hash-based signature scheme that utilizes an OTS and may use a private key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme. Hash-based signature balancing, as described herein, may similarly balance chain function operations.

Cryptography logic 840 is configured to perform various cryptographic and/or security functions on behalf of the signing device 810. In some embodiments, the cryptography logic 840 may be embodied as a cryptographic engine, an independent security co-processor of the signing device 810, a cryptographic accelerator incorporated into the processor(s) 820, or a standalone software/firmware. In some embodiments, the cryptography logic 840 may generate and/or utilize various cryptographic keys (e.g., symmetric/asymmetric cryptographic keys) to facilitate encryption, decryption, signing, and/or signature verification. Additionally, in some embodiments, the cryptography logic 840 may facilitate to establish a secure connection with remote devices over communication link. It should further be appreciated that, in some embodiments, the cryptography module 840 and/or another module of the first device 810 may establish a trusted execution environment or secure enclave within which a portion of the data described herein may be stored and/or a number of the functions described herein may be performed.

After the signature is generated as described above, the message, M, and signature may then be sent by first device 810, e.g., via communication logic 842, to second device 850 via network communication link 890. In an embodiment, the message, M, may not be encrypted prior to transmission. In another embodiment, the message, M, may be encrypted prior to transmission. For example, the message, M, may be encrypted by cryptography logic 840 to produce an encrypted message.

Second device 850 may also include one or more processors 860 and a memory 862 to store a public key 864. As described above, the processor(s) 860 may be embodied as any type of processor capable of performing the functions described herein. For example, the processor(s) 860 may be embodied as a single or multi-core processor(s), digital signal processor, microcontroller, or other processor or processing/controlling circuit. Similarly, the memory 862 may be embodied as any type of volatile or non-volatile memory or data storage capable of performing the functions described herein. In operation, the memory 862 may store various data and software used during operation of the second device 850 such as operating systems, applications, programs, libraries, and drivers. The memory 862 is communicatively coupled to the processor(s) 860.

In some examples the public key 864 may be provided to verifier device 850 in a previous exchange. The public key, $p_k$, is configured to contain a number L of public key elements, i.e., $p_k = [p_{k1}, \ldots, p_{kL}]$. The public key 864 may be stored, for example, to memory 862.

Second device 850 further comprises authentication logic 870 which includes hash logic 872, signature logic, and verification logic 876. As described above, hash logic 872 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 870 is configured to generate a verification signature based, at least in part, on the signature received from the first device and based, at least in part, on the received message representative (m'). For example, authentication logic 870 may configured to perform the same signature operations, i.e., apply the same hash function or chain function as applied by hash logic 832 of authentication logic 830, to each received message element a number, $N-m_{i'}$ (or $m_{i'}$), times to yield a verification message element. Whether a verification signature, i.e., each of the L verification message elements, corresponds to a corresponding public key element, $p_{ki}$, may then be determined. For example, verification logic 870 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

As described in greater detail below, in some examples the authentication logic 830 of the first device 810 includes one or more accelerators 838 that cooperate with the hash logic 832, signature logic 834 and/or verification logic 836 to accelerate authentication operations. Similarly, in some examples the authentication logic 870 of the second device 810 includes one or more accelerators 878 that cooperate with the hash logic 872, signature logic 874 and/or verification logic 876 to accelerate authentication operations. Examples of accelerators are described in the following paragraphs and with reference to the accompanying drawings.

The various modules of the environment 800 may be embodied as hardware, software, firmware, or a combination thereof. For example, the various modules, logic, and other components of the environment 800 may form a portion of, or otherwise be established by, the processor(s) 820 of first device 810 or processor(s) 860 of second device 850, or other hardware components of the devices As such, in some embodiments, one or more of the modules of the environment 800 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 9A:
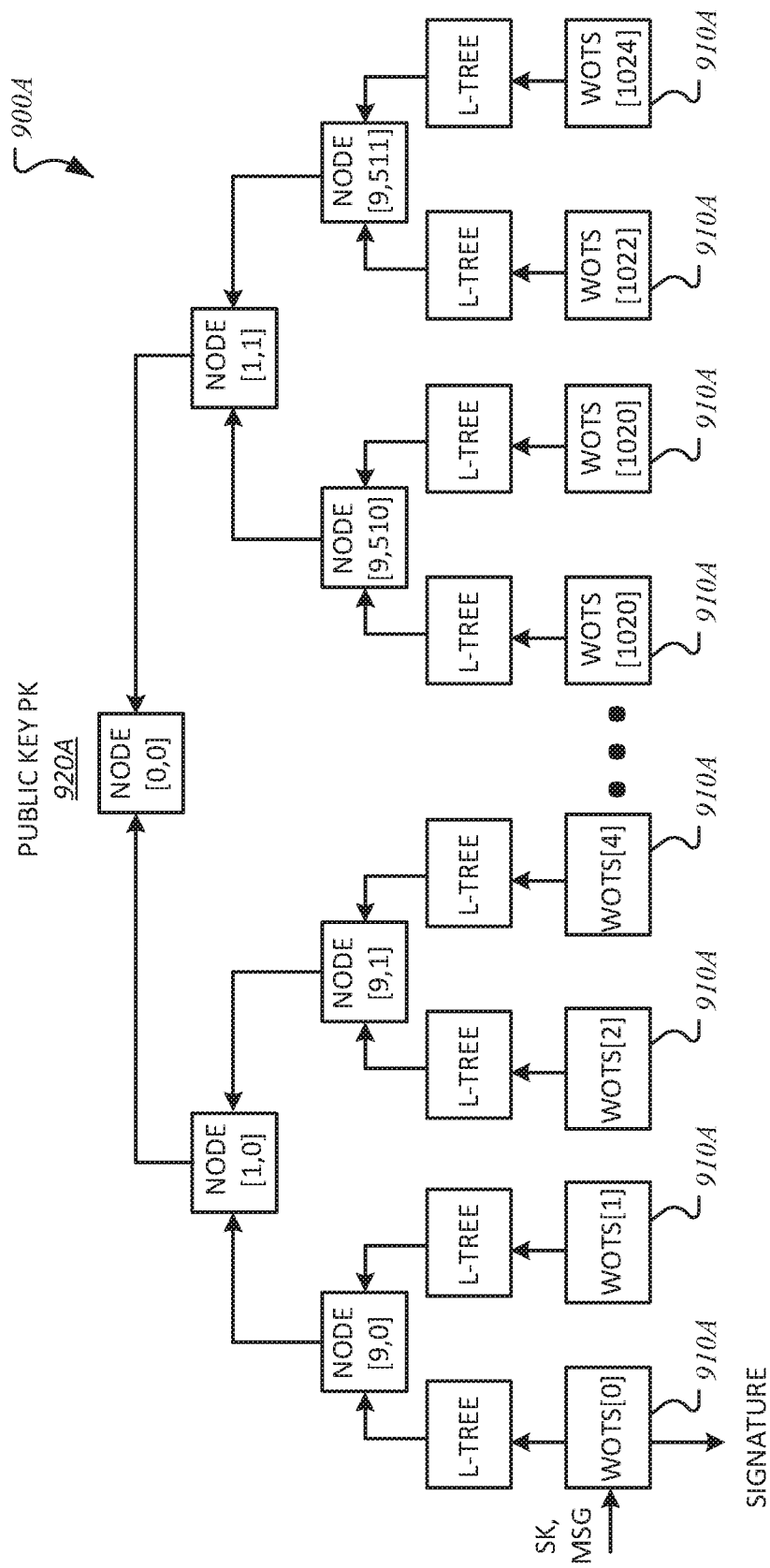
FIG. 9A is a schematic illustration of a Merkle tree structure illustrating signing operations, in accordance with some examples.

FIG. 9A is a schematic illustration of a Merkle tree structure illustrating signing operations, in accordance with some examples. Referring to FIG. 9A, an XMSS signing operation requires the construction of a Merkle tree 900A using the local public key from each leaf WOTS node 910 to generate a global public key (PK) 920. In some examples the authentication path and the root node value can be computed off-line such that these operations do not limit performance. Each WOTS node 910 has a unique secret key, "sk" which is used to sign a message only once. The XMSS signature consists of a signature generated for the input message and an authentication path of intermediate tree nodes to construct the root of the Merkle tree.

Figure 9B:
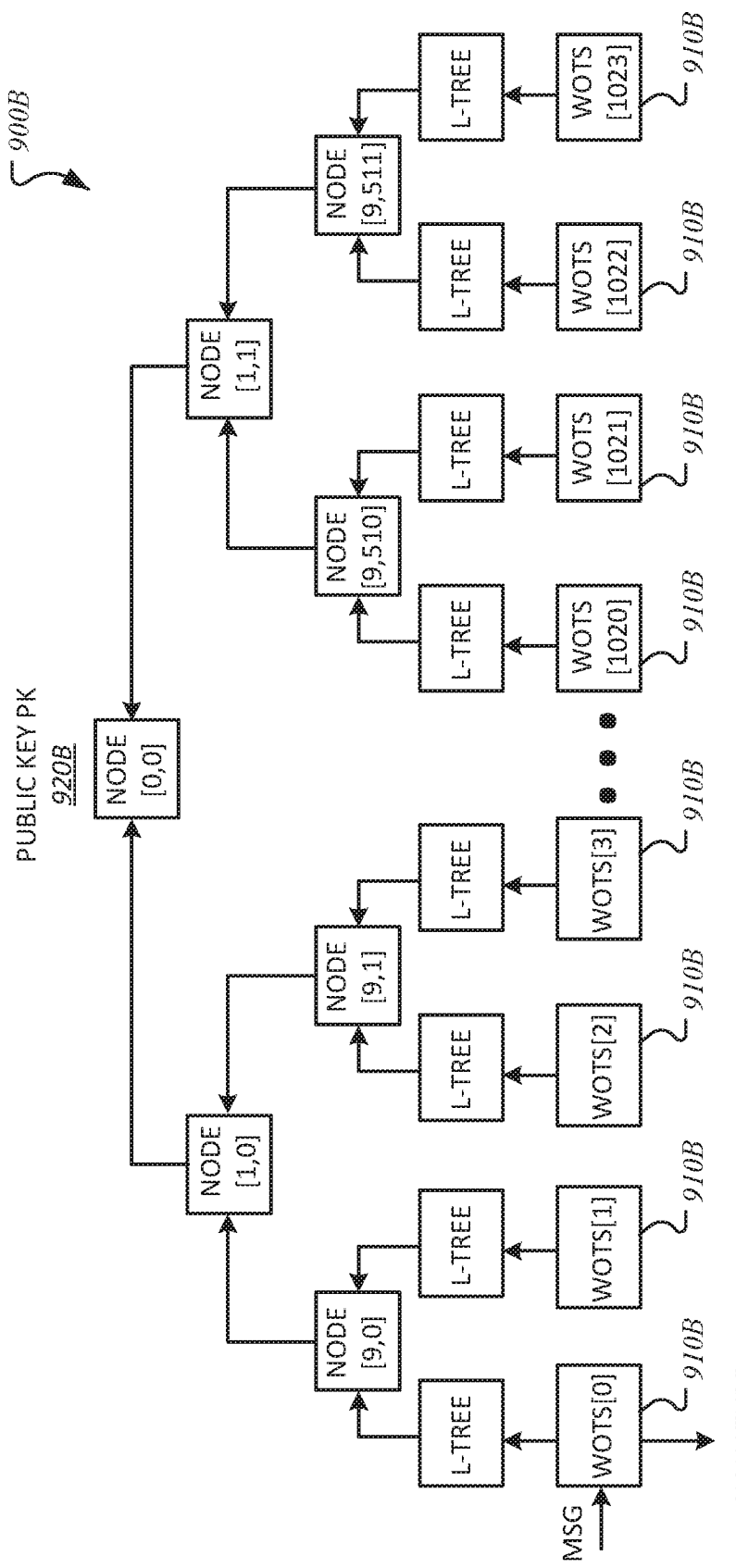
FIG. 9B is a schematic illustration of a Merkle tree structure 900B during verification, in accordance with some examples.

FIG. 9B is a schematic illustration of a Merkle tree structure 900B during verification, in accordance with some examples. During verification, the input message and signature are used to compute the local public key 920B of the WOTS node 920B, which is further used to compute the tree root value using the authentication path. A successful verification will match the computed tree root value to the public key PK shared by the signing entity. The WOTS and L-Tree operations constitute a significant portion of the XMSS sign/verify latency thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 3:
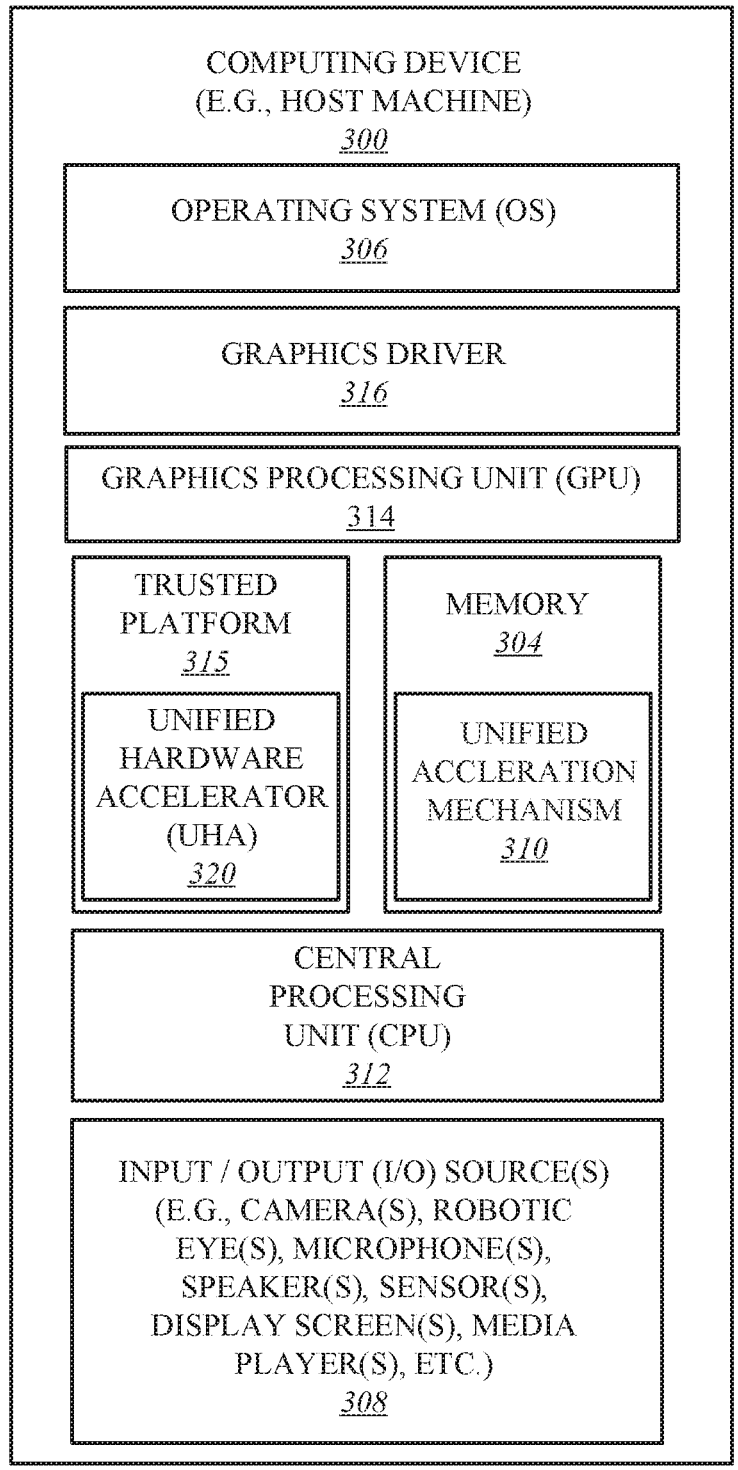
FIG. 3 illustrates a computing device employing a unified hardware accelerator and a unified acceleration mechanism according to one embodiment.

Now referring to FIG. 3 illustrating a computing device 300 employing a unified hardware accelerator 320 and a unified acceleration mechanism 310 according to one embodiment. Computing device 300 represents a communication and data processing device including or representing (without limitation) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted displays (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 300 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 300 may include a computer platform hosting an integrated circuit ("IC"), such as a system on a chip ("SoC" or "SOC"), integrating various hardware and/or software components of computing device 300 on a single chip. For example, computing device 300 comprises a data processing device having one or more processors including (but not limited to) central processing unit 312 and graphics processing unit 314 that are co-located on a common semiconductor package.

As illustrated, in one embodiment, computing device 300 may include any number and type of hardware and/or software components, such as (without limitation) graphics processing unit ("GPU" or simply "graphics processor") 314, graphics driver (also referred to as "GPU driver", "graphics driver logic", "driver logic", user-mode driver (UMD), UMD, user-mode driver framework (UMDF), UMDF, or simply "driver") 316, central processing unit ("CPU" or simply "application processor") 312, memory 304, network devices, drivers, and/or the like, as well as input/output (I/O) source(s) 308, such as touchscreens, touch panels, touch pads, virtual or regular keyboards, virtual or regular mice, ports, connectors, etc. Computing device 300 may include operating system (OS) 306 serving as an interface between hardware and/or physical resources of the computing device 300 and a user.

It is to be appreciated that a lesser or more equipped system than the example described above may be preferred for certain implementations. Therefore, any configuration of computing device 300 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). Terms like "logic", "module", "component", "engine", "circuitry", "element", and "mechanism" may include, by way of example, software, hardware, firmware, and/or a combination thereof.

In one embodiment, as illustrated, unified acceleration mechanism 310 may be hosted by memory 304 in communication with I/O source(s) 308, such as microphones, speakers, etc., of computing device 300. In another embodiment, unified acceleration mechanism 310 may be part of or hosted by operating system 306. In yet another embodiment, unified acceleration mechanism 310 may be hosted or facilitated by graphics driver 316. In yet another embodiment, unified acceleration mechanism 310 may be hosted by or embedded in central processing unit ("CPU" or simply "application processor") 312 and/or graphics processing unit ("GPU" or simply graphics processor") 314 as one or more hardware components, such as implemented by one or more analog or digital circuits, logic circuits, programmable processors, programmable controllers, GPUs, digital signal processors (DSPs), application specific integrated circuits (ASICs), programmable logic devices (PLDs), \ field programmable logic devices (FPLDs), and/or the like. It is, therefore, contemplated that one or more portions or components of unified acceleration mechanism 310 may be employed or implemented as hardware, software, firmware, or any combination thereof.

As further illustrated, computing device 300 includes trusted platform 315 hosting unified accelerator 320 including a hardware accelerator, where trusted platform 315 is in communication with application processor 312 and graphics processor 314. As will be further discussed in this document, in one embodiment, UHA 320 is hosted by trusted platform 315, while it is facilitated by unified acceleration mechanism 310, to perform any number and type of tasks to ensure security of computing device 300 and/or any other computing devices coupled to or in communication with computing device 300 against attacks by both classical and post-quantum computers.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events Computing device 300 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, a data processing machine, a data processing device, network of computers, or other electronic devices, may result in the one or more machines carrying out operations in accordance with embodiments described herein. As described with reference to FIG. 3, a machine may include one or more processors, such as a CPU, a GPU, etc. A machine-readable medium may include, but is not limited to, floppy diskettes, optical disks, Compact Disc-Read Only Memories (CD-ROMs), magneto-optical disks, ROMs, Random Access Memories (RAMs), Erasable Programmable Read Only Memories (EPROMs), Electrically Erasable Programmable Read Only Memories (EEPROMs), magnetic or optical cards, flash memory, or other type of media/machine-readable medium suitable for storing machine-executable instructions.

For example, when reading any of the apparatus, method, or system claims of this patent to cover a purely software and/or firmware implementation, at least one of UHA 320 and unified acceleration mechanism 310 may be expressly defined to include a non-transitory computer readable storage device or storage disk such as a memory, a digital versatile disk (DVD), a compact disk (CD), a Blu-ray disk, etc., including the software and/or firmware.

Moreover, one or more elements of UHA 320 and/or unified acceleration mechanism 310 may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout this document, the term "user" may be interchangeably referred to as "viewer", "observer", "speaker", "person", "individual", "end-user", "developer", "programmer", "administrators", and/or the like. For example, in some cases, a user may refer to an end-user, such as a consumer accessing a client computing device, while, in some other cases, a user may include a developer, a programmer, a system administrator, etc., accessing a workstation serving as a client computing device. It is to be noted that throughout this document, terms like "graphics domain" may be referenced interchangeably with "graphics processing unit", "graphics processor", or simply "GPU"; similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document.

Further, throughout this document, terms like "request", "query", "job", "work", "work item", and "workload" are referenced interchangeably. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12,etc., where "dispatch" may be interchangeably referenced as "work unit" or "draw", while "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as three-dimensional (3D) games, augmented reality applications, etc.

Figure 4:
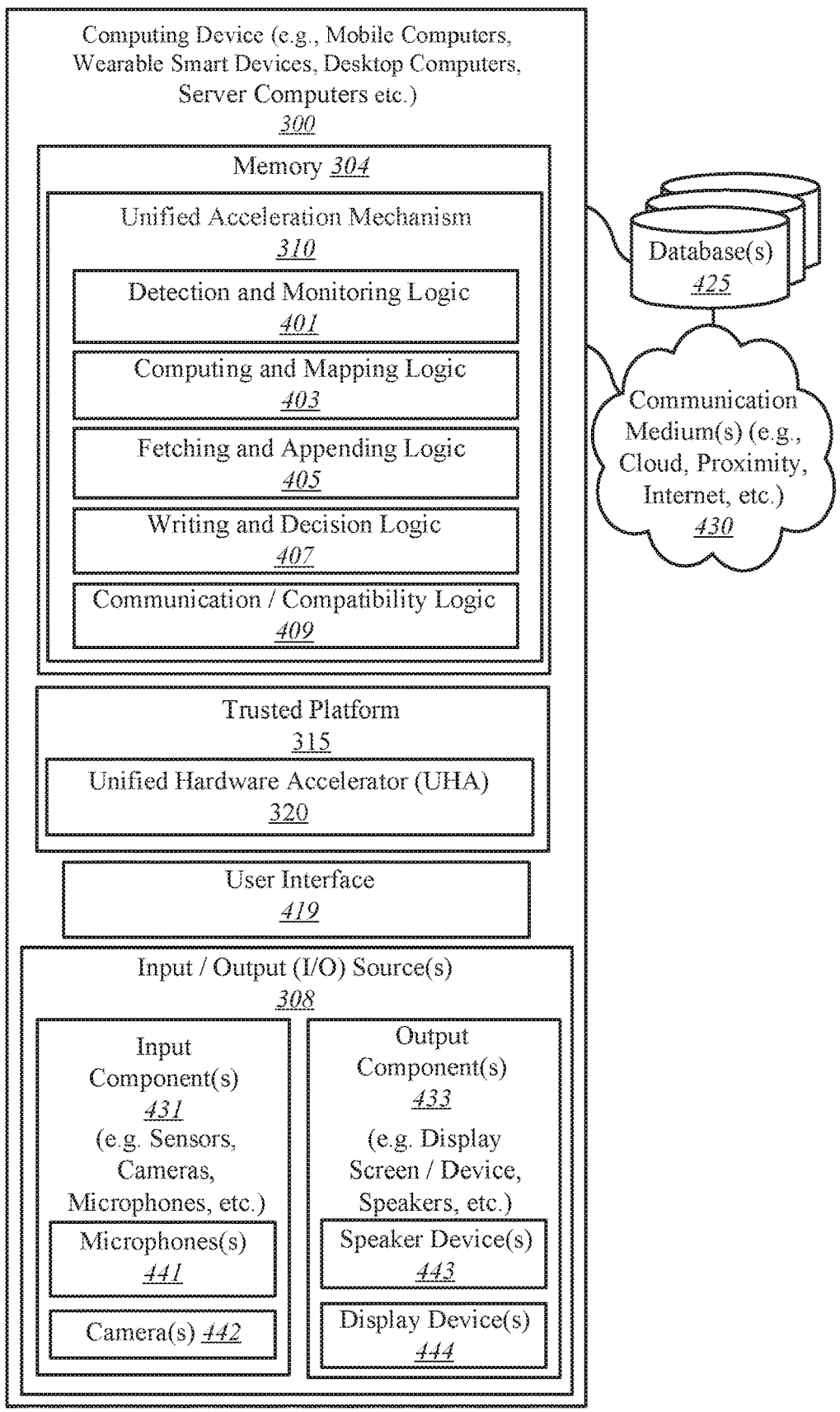
FIG. 4 illustrates a unified hardware accelerator and a unified acceleration mechanism according to one embodiment.

FIG. 4 illustrates UHA 320 and unified acceleration mechanism 310 of FIG. 3 according to one embodiment. For brevity, many of the details already discussed with reference to FIG. 3 are not repeated or discussed hereafter. In one embodiment, unified acceleration mechanism 310 may include any number and type of elements or components, such as (but not limited to): detection and monitoring logic 401; computing and mapping logic 403; fetching and appending logic 405; writing and decision logic 407; and communication/compatibility logic 409.

Computing device 300 is further shown to include user interface 419 (e.g., graphical user interface (GUI)-based user interface, Web browser, cloud-based platform user interface, software application-based user interface, other user or application programming interfaces (APIs), etc.). Computing device 300 may further include I/O source(s) 308 having input component(s) 431, such as camera(s) 442 (e.g., Intel® RealSense™ camera), microphone(s) 441, sensors, detectors, keyboards, mice, etc., and output component(s) 433, such as display device(s) or simply display(s) 444 (e.g., integral displays, tensor displays, projection screens, display screens, etc.), speaker devices(s) or simply speaker(s), etc.

Computing device 300 is further illustrated as having access to and/or being in communication with one or more database(s) 425 and/or one or more of other computing devices over one or more communication medium(s) 430 (e.g., networks such as a proximity network, a cloud network, an intranet, the Internet, etc.).

In some embodiments, database(s) 425 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, terms like "logic", "module", "component", "engine", "circuitry", "element", and "mechanism" may include, by way of example, software, hardware, firmware, and/or any combination thereof.

As previously described, existing public-key digital signature techniques, such as Public Key Cryptography Standards (PKCS) RSA, Elliptic Curve Digital Signature Algorithm (ECDSA) elliptic curve cryptography (ECC), etc., are vulnerable to attacks, such as those using quantum computers. Efforts are underway to develop standards for algorithms that are secure against quantum computers. For example, XMSS is the first post-quantum secure public-key digital signature scheme to be published by the Internet Engineering Task Force (IETF) in RFC-8391. Accelerators, such as exponentiation acceleration unit (EAU), to perform RSA operations have a dedicated hash engine (e.g., SHA2/SHA384) to support various algorithms standardized as part of PKCS #1 v2, such as Optical Asymmetric Encryption Padding (OAEP), probabilistic signature schemes (PSS), etc. The accelerators are also equipped with large memory macros, such as a register file, to hold parameters such as base, exponent, secret key, intermediate results and ciphertext, etc.

Embodiments offer a novel unified hardware accelerator, such as UHA 320, that supports both classical and post-quantum digital signature schemes by, for example, efficiently reusing any available memory and hash engines, resulting in significant area reduction, such as 30% area reduction, over independent hardware implementations. This novel UHA 320, as facilitated by unified acceleration mechanism 310, enables a smooth transition from classical signature schemes to post-quantum digital signature schemes with negligible overhead.

Conventional techniques require separate implementations of hardware components for classical and post-quantum digital signature schemes, which includes separate compute (e.g., hash engine) and memory macros (e.g., register files) to enable signature schemes. These separate hardware implementations require a large physical area and power overhead, despite similarities in underlying operations of the digital signature schemes. These conventional techniques also involve significant amount of design and validation efforts for separate hardware implementations.

Embodiments provide for the novel UHA 320 that offers significant reduction, such as over 30% (e.g., 285K gate count as opposed to 400 k gate count) over the conventional separate hardware implementations. This area reduction also translates into similar savings in power and further, the novel technique minimizes any design and validation efforts, as, in one embodiment, existing engines may be tweaked (without having to add additional engines) to extend support to post-quantum digital signature schemes. As previously discussed, this novel technique also supports any classical digital signature schemes, while fully equipped to handle post-quantum digital signature schemes based on ongoing developments in quantum computing.

Public key digital signature schemes are used for validating authenticity of messages, where a sender signs a message with a private-key and the verifier validates the authenticity by decrypting a signature with a public key. For example, as illustrated with respect to FIG. 5A, RSA-based digital signature schemes employ multiple hash engines 501, 503 and perform message padding followed by hashing operations to compress a message to a suitable size, as facilitated by RSA-based public-key digital signature engine ("RSA engine") 500 of FIG. 5A. This compressed message then undergoes modular exponentiation, using module exponentiation engine 507, which forms the basis of RSA encryption/decryption. The standard key-size currently used is 4096 bits to enhance tolerance to attacks using quantum computers such that RSA engine 500 consists of 8 banks of register files, such as register file bank 505, where each bank consists of 32 entries of 128b words. For example, modular exponentiation engine 507 performs modular multiplication and reduction based on a key bit and writes the result back into a register file at register file bank 505. RSA engine 500 supports various public-key cryptographic algorithms as standardized by PKCS #1 v2, such as OAEP, probabilistic signature scheme (PSS), PKCS sign/verify, etc. One of the key operations in these algorithms is a mask generation function (MGF), which employs hash engine 503 (e.g., SHA2/SHA384/SHA512) to expand/compress any message depending on the operation.

Figure 5A:
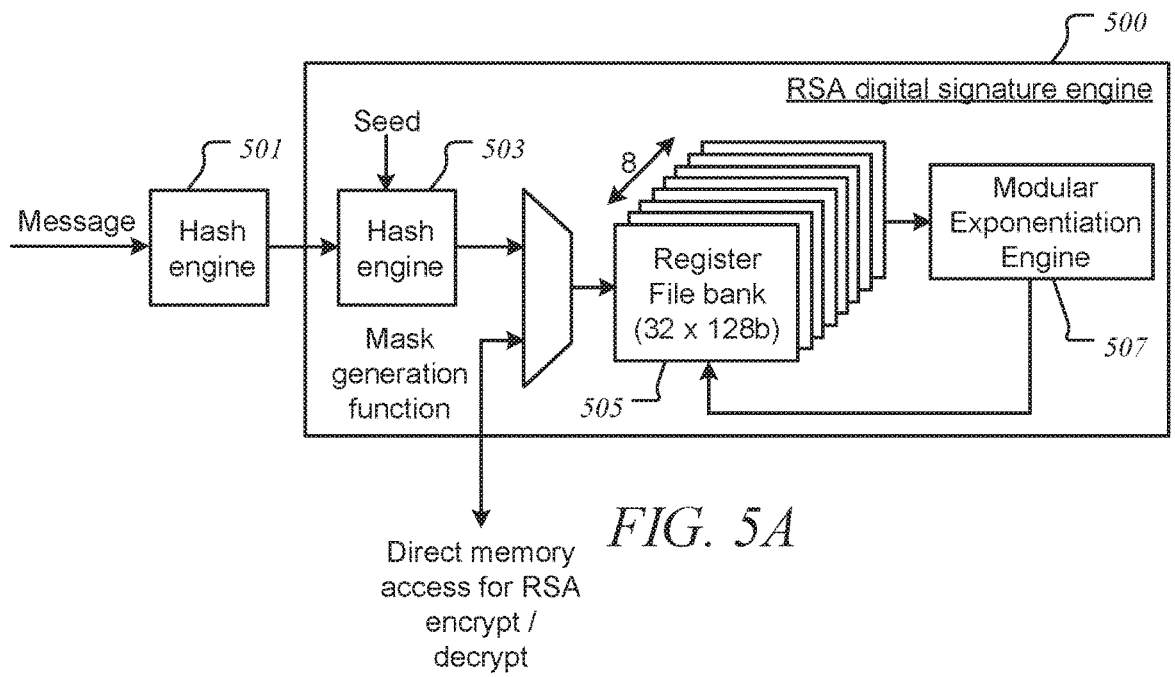
FIG. 5A illustrates an RSA-based digital signature scheme employing multiple hash engines according to one embodiment.

As illustrated, RSA engine 500 of FIG. 5A employs two hash engines 501, 503, where one engine, such as hash engine 503, is embedded within the RSA module 500, with the other hash engine 501 is available externally for performing standalone hash operations using direct memory access (DMA) as well as performing message compression/expansion during digital signature operation. Similarly, RSA engine 500 may be used to perform message signing/verification operations as well as standalone RSA encrypt/decrypt operations by providing a direct access path to register file bank 505.

Figure 5B:
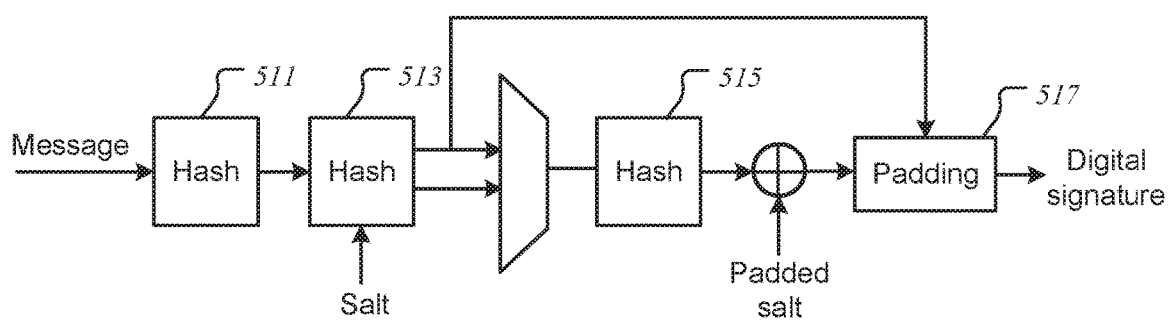
FIG. 5B illustrates mapping of a probabilistic signature scheme to an RSA engine according to one embodiment.

Referring to FIG. 5B, it illustrates mapping 510 of a PSS to an RSA engine, such as RSA engine 500 of FIG. 5A. For example, the PSS converts an arbitrary message length into a known length using two rounds of hash operations using external hash engines 511, 513. During the second round of hash operation, a compressed message is padded with a randomly generated salt value and sent to hash engine 513, where the compressed message after two rounds of hashing is then sent to an RSA engine having another hash engine 515, where the message undergoes message expansion followed by modular addition with a padded message consisting of the same salt value. The final encoded message is constructed by padding 517 the modular addition output with the original hashed input message to the RSA engine. Similarly, mapping may be performed for PSS verification and other modes of the PKCS digital signature scheme.

Figure 5C:
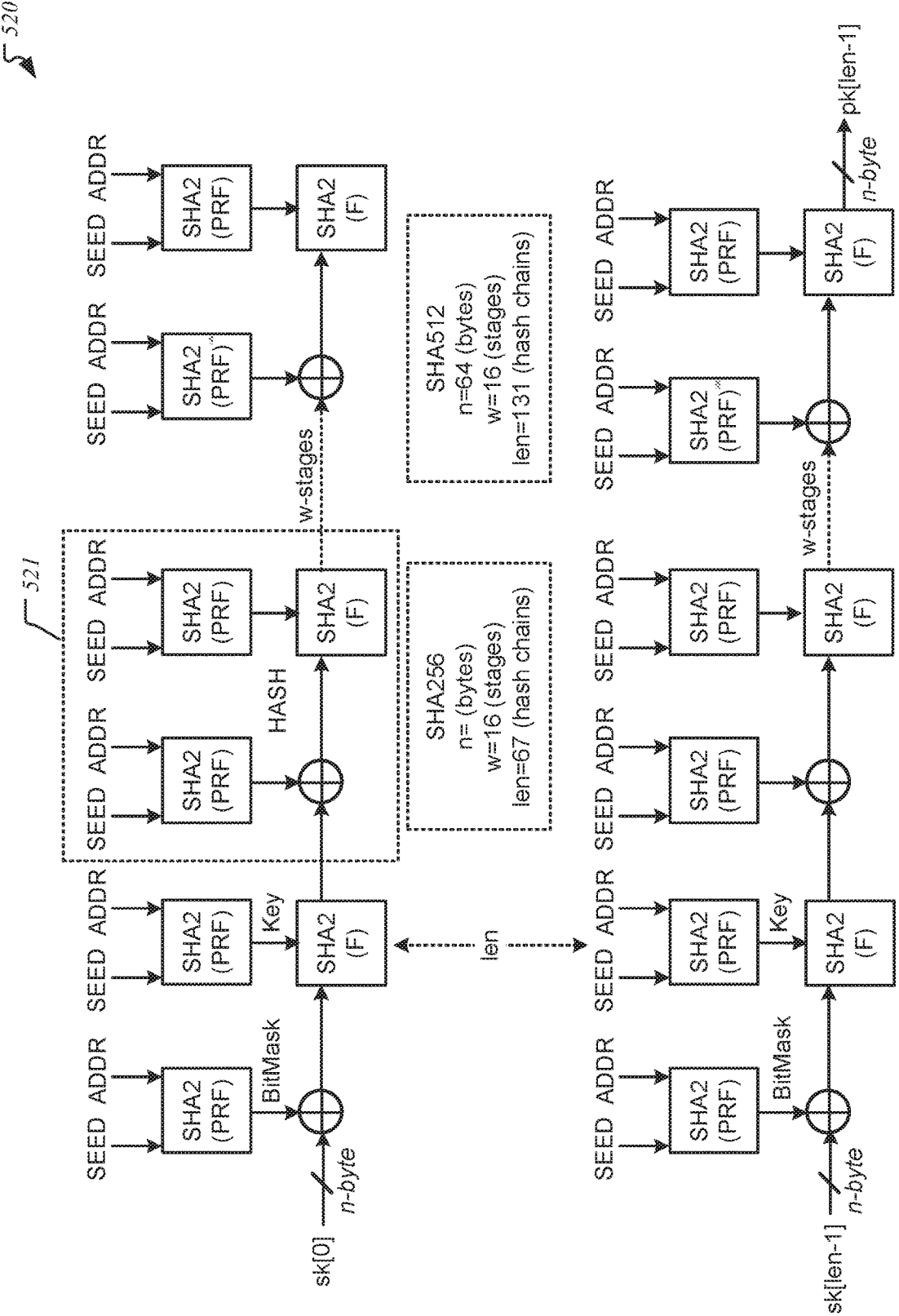
FIG. 5C illustrates a Winternitz One Time Signature (WOTS+) as an underlying operation for key generation, sign/verify operations, etc., according to one embodiment.

Since any existing PKCS digital signature schemes are vulnerable to attacks using quantum computers, various efforts are underway to develop quantum-attacks resistant digital signature schemes. One such scheme based on structured hash-based signatures is the Extended Merkel Signature Scheme (XMSS), where the XMSS uses WOTS+ as the underlying operation for key generation, sign/verify operations, as illustrated with respect to WOTS+ one-time signature generation technique 520 of FIG. 5C. For example, a WOTS+ operation may involve 67 parallel chains of 16 SHA2-256 HASH function, each with a secret key sk[66:0] as input as shown in FIG. 5C.

Figure 5D:
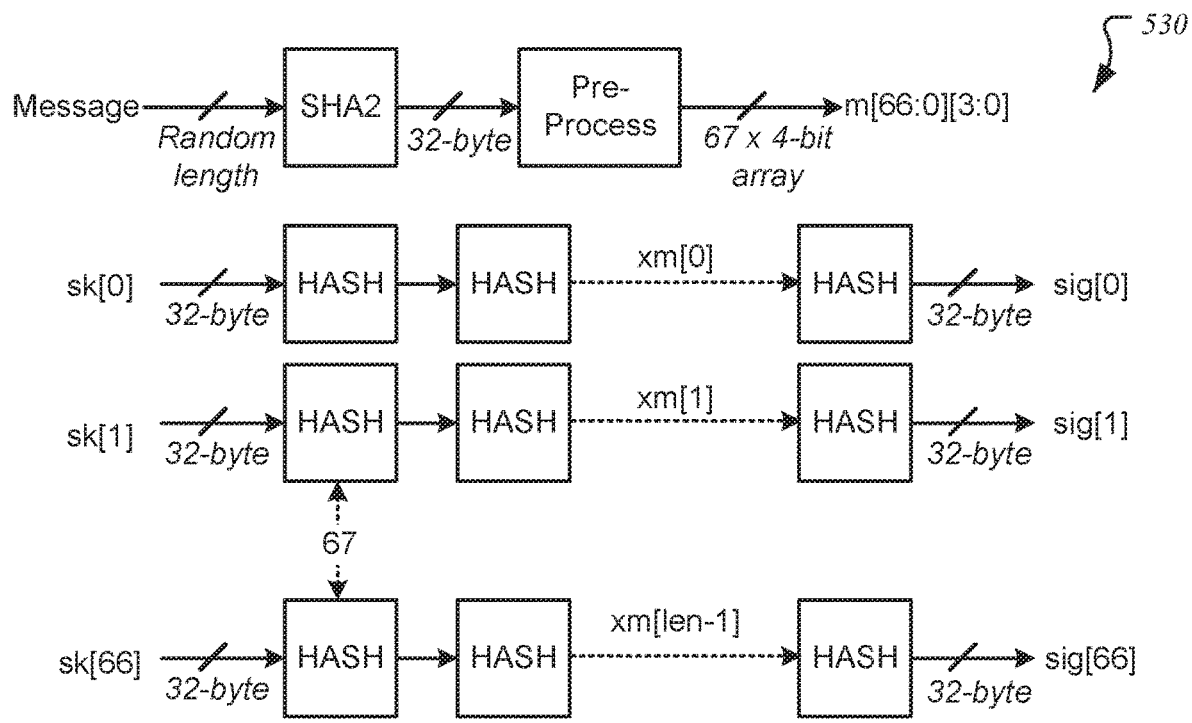
FIG. 5D illustrates a WOTS+ signature generation technique according to one embodiment.
Figure 5E:
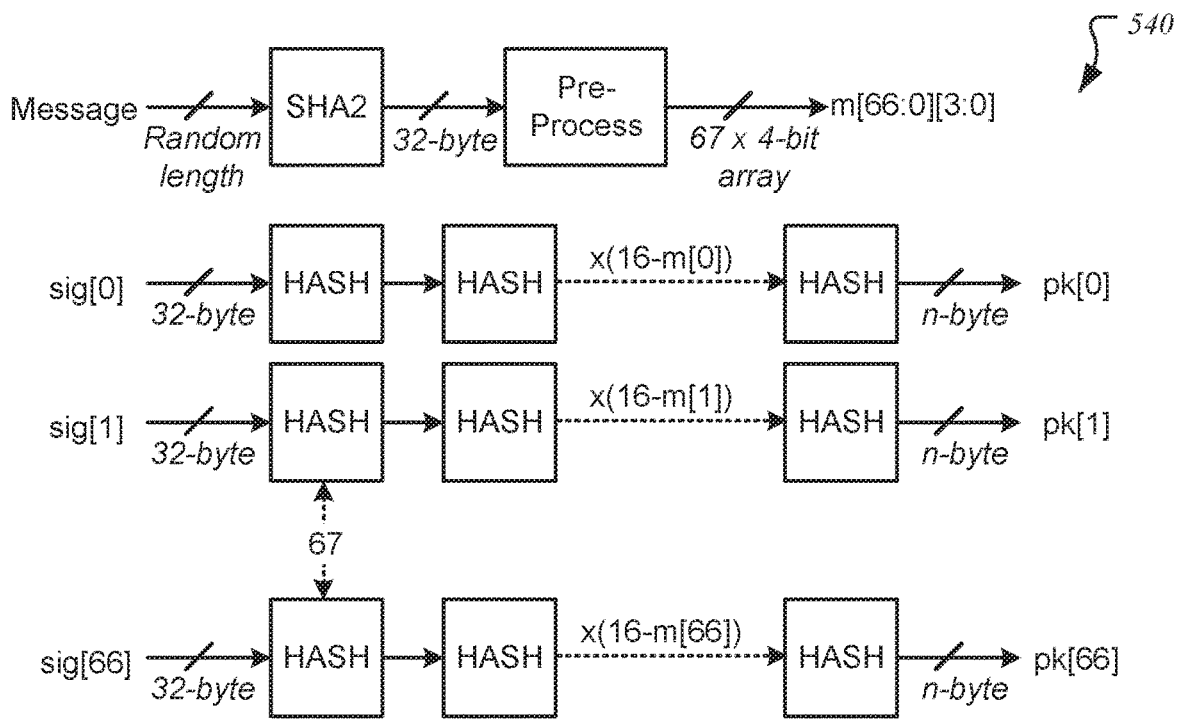
FIG. 5E illustrates a WOTS+ signature verification technique according to one embodiment.

As illustrated, each hash operation, such as hash operation 521, in the chain is shown as consisting of two pseudo-random functions using SHA2-256 to generate a bitmask and a key. The bitmask is XOR-ed with the previous hash and concatenated with the key as input message to a $3^{rd}$ SHA2-256 hash operation, where the 67×32-byte WOTS public key pk[66:0] is generated by hashing secret key sk across the 67 hash chains. For message signing, the input message is hashed and pre-processed to compute a 67×4-bit value which is used as an index to choose an intermediate hash value in each chain, as illustrated with respect to WOTS signature generation technique 530 of FIG. 5D. During verification, the message is again hashed to compute the signature indices and further compute the remaining HASH operations in each chain to compute the WOTS public key pk, as illustrated with respect to WOTS signature verification 540 of FIG. 5E. This technique, along with the authentication path, is used to compute the root of the Merkel tree and then compare it with the shared public key PK to verify the message. As will be further discussed in this document, accelerating the SHA2 operation provides a maximum performance improvement for XMSS.

As will be further described with reference to FIGS. 6A, 6B, and 6C, UHA 320 refers to a novel unified hardware accelerator that residing at or hosted by trusted platform 315 in communication with one or more of application processor 312 and graphics processor 314. In one embodiment, the UHA 320 is facilitated by unified acceleration mechanism 310 to perform any pertinent operations to function as a unified hardware accelerator that allows for efficient security against both classical and post-quantum computer attacks. For example, unified acceleration mechanism 310 includes detection and monitoring logic 401; computing and mapping logic 403; fetching and appending logic 405; writing and decision logic 407; and communication/compatibility logic 409.

In one embodiment, detection and monitoring logic 401 is triggered to detect and monitor both classical and XMSS processes along with detecting and monitoring various components and processes of UHA 320. In one embodiment, as further illustrated with respect to FIGS. 6B-6C, computing and mapping logic 403 is triggered to compute bitmask from ADDR and SEED and write to RF Bank$_0$ using SHA2 engine and further, computing and mapping logic 403 continues with computing key from ADDR and SEED and write to RF Bank$_1$ using SHA2 engine.

Further, for example, fetching and appending logic 405 is triggered to fetch a previous hash from RF Bank$_2$ and add it with Bitmask from RF Bank$_0$, and appending any results to key and compute hash using SHA2 engine. This result is then written back to RF Bank$_2$ by writing and decision logic 407, while deciding on whether the signature/verification loop has been completed. If the signature/verification loop is not done, then writing and decision logic 407 loops the process back to computation of bitmask from ADDR and SEED and writing of the bitmask to RF Bank$_0$ using SHA engine. If, however, the signature/verification loop is completed, writing and decision logic 407 communicates this information to fetching and appending logic 405 to fetch the result from RF Bank$_2$ through DMA.

Referring to I/O source(s) 308, it is contemplated that embodiments are not limited to any number or type of microphone(s) 441, camera(s) 442, speaker(s) 443, display(s) 444, etc., for capture or presentation of data. For example, as facilitated by detection and monitoring logic 401, one or more of microphone(s) 441 may be used to detect speech or sound simultaneously from users, such as speakers. Similarly, as facilitated by detection and monitoring logic 401, one or more of camera(s) 442 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 433 may include any number and type of speaker(s) or speaker device(s) 443 to serve as output devices for outputting or giving out audio from computing device 300 for any number or type of reasons, such as human hearing or consumption. For example, speaker(s) 443 work the opposite of microphone(s) 441 where speaker(s) 443 convert electric signals into sound.

Further, input component(s) 431 may include any number or type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 431 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 431 may further include one or more of supporting or supplemental devices for capturing and/or sensing of data, such as illuminators (e.g., IR illuminator), light fixtures, generators, sound blockers, etc.

It is further contemplated that in one embodiment, input component(s) 431 may include any number and type of context sensors (e.g., linear accelerometer) for sensing or detecting any number and type of contexts (e.g., estimating horizon, linear acceleration, etc., relating to a mobile computing device, etc.). For example, input component(s) 431 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 431 may include (without limitation): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 431 may further include voice recognition devices, photo recognition devices, facial and other body recognition components, voice-to-text conversion components, etc.

Similarly, output component(s) 433 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 433 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 300, and may be referenced interchangeably with "person", "individual", "human", "him", "her", "child", "adult", "viewer", "player", "gamer", "developer", "programmer", and/or the like.

Communication/compatibility logic 409 may be used to facilitate dynamic communication and compatibility between various components, networks, database(s) 425, and/or communication medium(s) 430, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, firmware, and/or any combination thereof. In one example, "logic" may refer to or include a software component that works with one or more of an operating system, a graphics driver, etc., of a computing device, such as computing device 300. In another example, "logic" may refer to or include a hardware component that is capable of being physically installed along with or as part of one or more system hardware elements, such as an application processor, a graphics processor, etc., of a computing device, such as computing device 300. In yet another embodiment, "logic" may refer to or include a firmware component that is capable of being part of system firmware, such as firmware of an application processor or a graphics processor, etc., of a computing device, such as computing device 300.

Further, any use of a particular brand, word, term, phrase, name, and/or acronym, such as "unified hardware accelerator", "UHA", "unified accelerator", "UA", "classical signature schemes or attacks", "post-quantum signature schemes or attacks", "RSA", "XMSS", "hash engine", "computing", "fetching", "appending", "writing", "creating", "training", "inferencing", "classifying", "estimating", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from unified acceleration mechanism 310 and/or UHA 320 to facilitate various embodiments including adding, removing, and/or enhancing certain features. For brevity, clarity, and ease of understanding of unified acceleration mechanism 310 and/or UHA 320, many of the standard and/or known components, such as those of a computing device are not shown or discussed here. It is contemplated that embodiments, as described herein, are not limited to any technology, topology, system, architecture, and/or standard and are dynamic enough to adopt and adapt to any future changes.

Figure 6A:
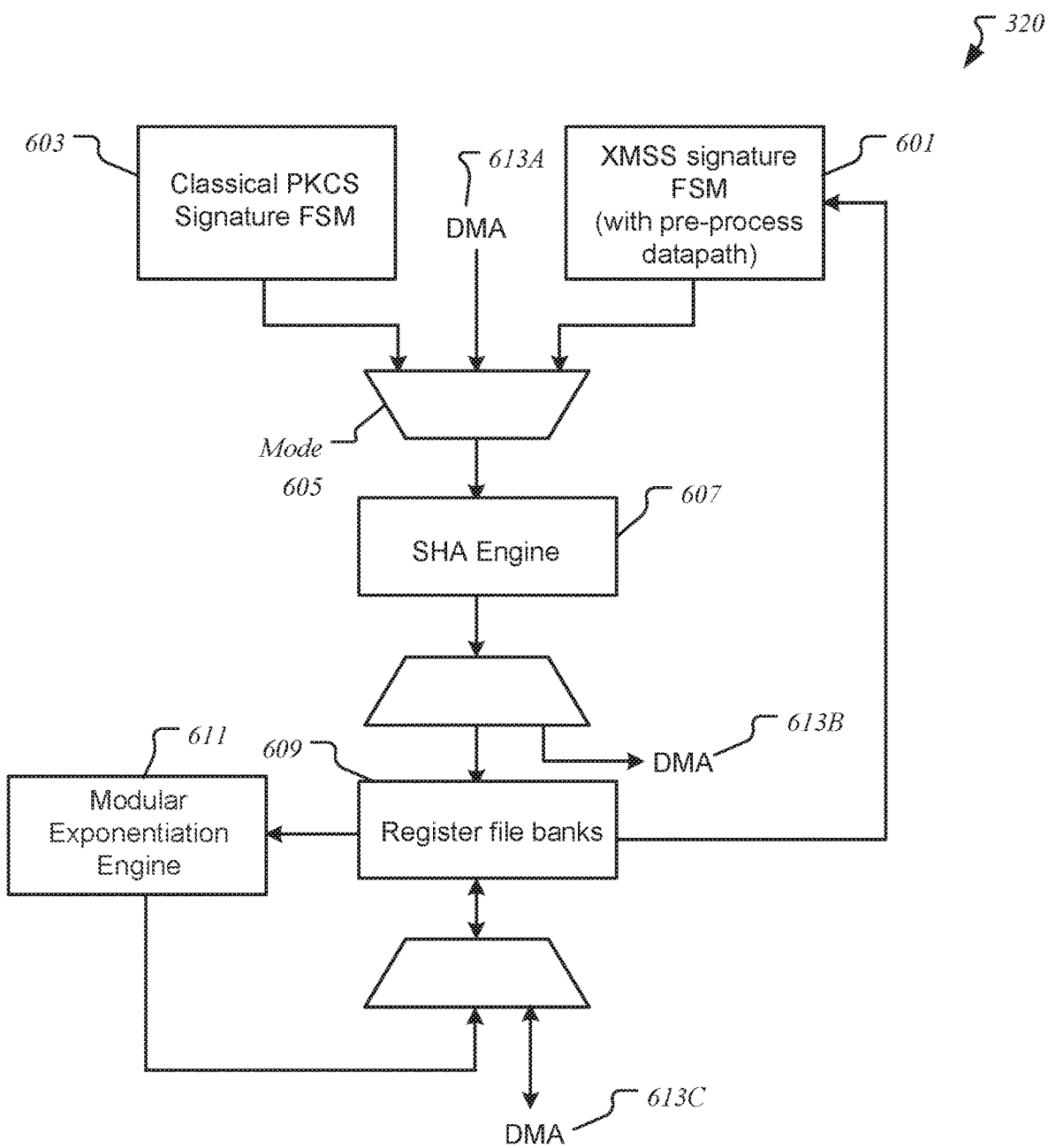
FIG. 6A illustrates an organizational scheme of a unified hardware accelerator according to one embodiment.

FIG. 6A illustrates an organizational scheme of UHA 320 of FIG. 3 according to one embodiment. For the sake of brevity, many of the details previously mentioned or discussed with reference to FIGS. 1-5E may not be discussed or repeated hereafter. The illustrated embodiment presents an organizational setup of UHA 320 that maps both classical and post-quantum digital signature schemes, significantly improving over conventional separate hardware implementations by, for example, reducing the physical area by 30%. In one embodiment, the illustrated UHA 320 consists of XMSS finite state machine (FSM) 601 in parallel with classical PKCS FSM 603, where a state machine is selected based on a select bit that can be programmed based on an application. Further, as illustrated, both state machines 601, 603 are shown in communication with a SHA or hash engine 607, using mode select bit ("mode") 605, and onto register file banks 609, using DMA 613A, 613B, 613C.

In one embodiment, this novel UHA 320 includes a single hash 607 engine as opposed to two engines in the baseline design, providing additional area savings. To ensure that hash engine 607 is available to perform standalone hash operations, DMA 613A, 613B, 613C is provided to bypass PKCS datapaths. Further, with respect to a classical PKCS scheme, any input data undergoes necessary hashing and gets written into register file banks and undergoes modular exponentiation in the RSA engine. Any result gets written back into a register file at register file banks 609 and can be read out through DMA 613A, 613B, 613C, where register file banks 609 also have direct memory access to populate the required contents, such as plaintext, secret key, configuration bits, etc. The result is also put through modular exponentiation engine 611 for module exponentiation and cycled back to register file banks 609.

Further, in one embodiment during an XMSS post-quantum operation, any classical signature datapaths, including classical FSM 603, are disabled using the mode 605, where XMSS FSM 601 controls the padding, as necessitated, and feeds the data to SHA engine 607, as facilitated by unified acceleration mechanism 310 of FIG. 3. Any pre-processing data optimizations are performed by a pre-process datapath and any contents are loaded into register file banks 609.

Figure 6B:
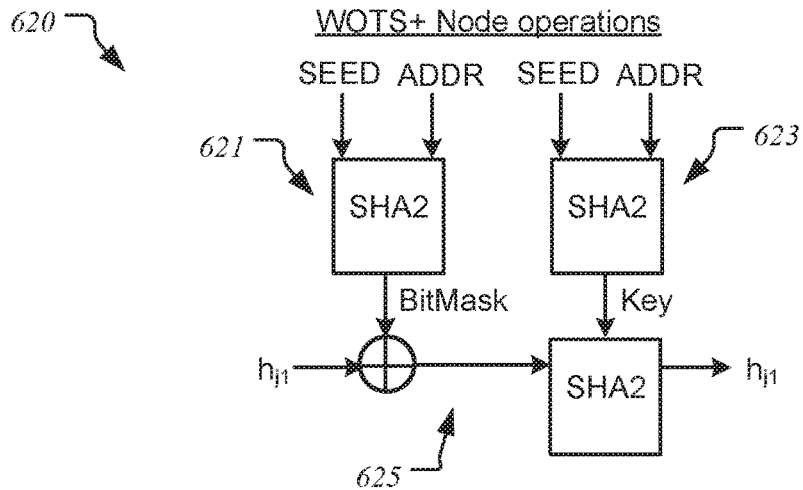
FIG. 6B illustrates hash operations at a WOTS+ node based on a WOTS+ one-time signature generation technique according to one embodiment.
Figure 6C:
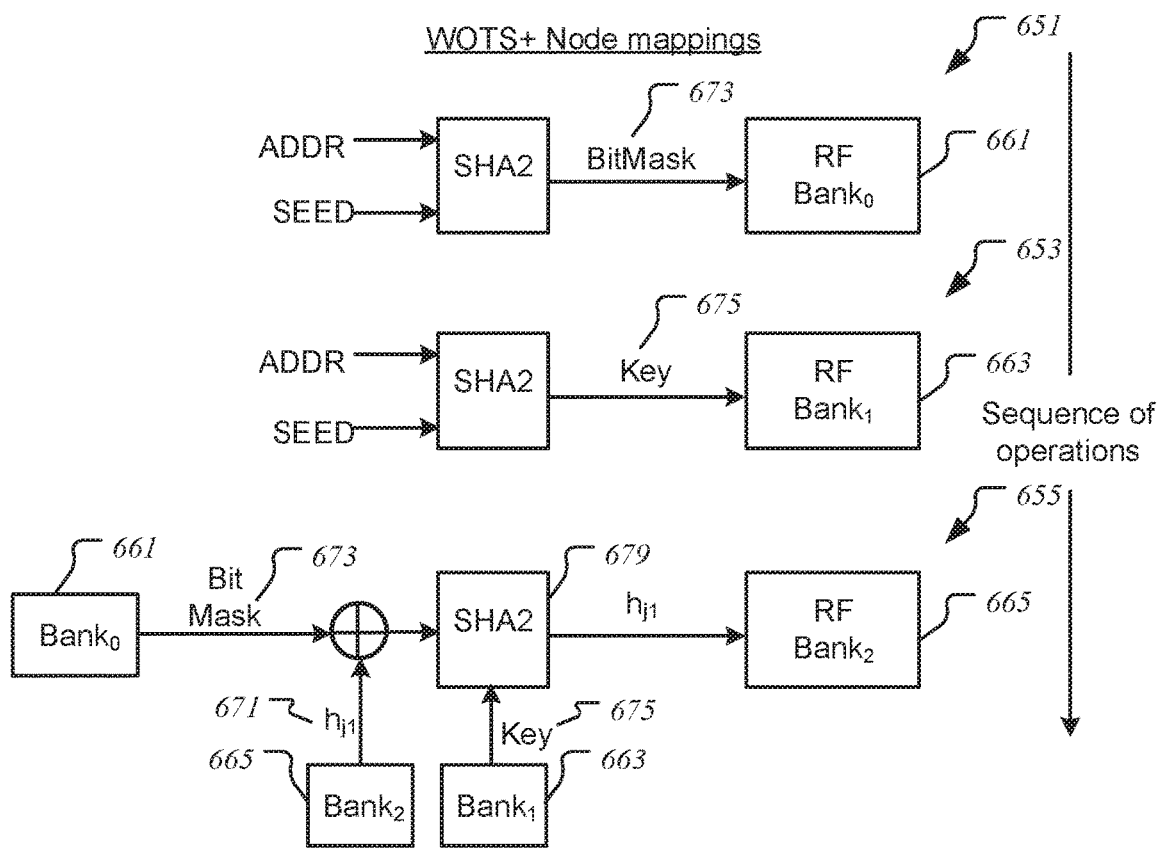
FIG. 6C illustrates a transaction sequence for mapping of WOTS+ node operations of FIG. 6B onto unified hardware accelerator of FIG. 3 according to one embodiment.

FIG. 6B illustrates hash operations 621, 623, 625 at a WOTS+ node 620 based on a WOTS+ one-time signature generation technique according to one embodiment, while FIG. 6C illustrates a transaction sequence 650 for mapping 651, 653, 655 of WOTS+ node operations of FIG. 6B onto UHA 320 of FIG. 3 according to one embodiment. For the sake of brevity, many of the details previously mentioned or discussed with reference to FIGS. 1-6A may not be discussed or repeated hereafter.

As illustrated with respect to FIG. 6B, WOTS+ node 620 is shown to include three hash operations 621, 623, 625, where a first hash operation, such as hash operation 621, takes address and seed as inputs and creates a bitmask, while a second has operation, such as hash operation 623, produces a key. The resulting bitmask is then added to the previous has message and padded with the key and is then fed into a third has operation, such as hash operation 625, to generate a current hash message.

In one embodiment, as illustrated with respect to FIG. 6C, hash operations 621, 623, 625 of FIG. 6B are performed sequentially, having any resulting outputs mapped to and written into separate RF banks through corresponding mapping transactions 651, 653, 655, respectively. For example, during third mapping transaction 655, a previous hash message 671 is read from RF Bank$_2$ 665 and added with bitmask 673 stored in RF Bank$_0$ 661, padded with key 675 stored in RF Bank$_1$ 663 and send to hash engine 679, such as SHA2, where the output of this hash engine 679 is written back to RF Bank$_2$ 665.

In one embodiment, having separate banks 661, 663, 665 reduces read latencies such that the needed inputs are read simultaneously. For example, a signature size in WOTS+ node 620 of FIG. 6B includes 67 entries, where each entry is 32 bytes wide. The authentication path in XMSS may necessitate an input of size 10 entries×32 bytes and thus a total storage may be that of size 77 entries×32 bytes. The RF in an RSA engine may consist of 256 entries, with each entry being 16 bytes wide. Hence, WOTS+ node 620 of FIG. 6B may be mapped to 154 entries in an RF bank without having the need for any additional memory.

Conventional separate hardware implementations can incur the following overheads: 250 k gates for RSA (including memory), 35 k gates for SHA engines, and 115 k gates for XMSS, with a total of 480 k gates.

In contrast, in one embodiment, this novel UHA 320 of FIG. 3 may necessitate a great deal fewer gates, such as 285 k gates, resulting in a saving of about 30% in terms of physical area and power savings. Further, as illustrated with respect to FIG. 3, this novel UHA 320 may reside in or hosted by trusted platform 315 in communication with CPU 312 and/or GPU 314, where this trusted platform 315 of FIG. 3 may refer to a dedicated platform, such as a field-programmable gate array (FPGA) platform, etc.

Figure 6D:
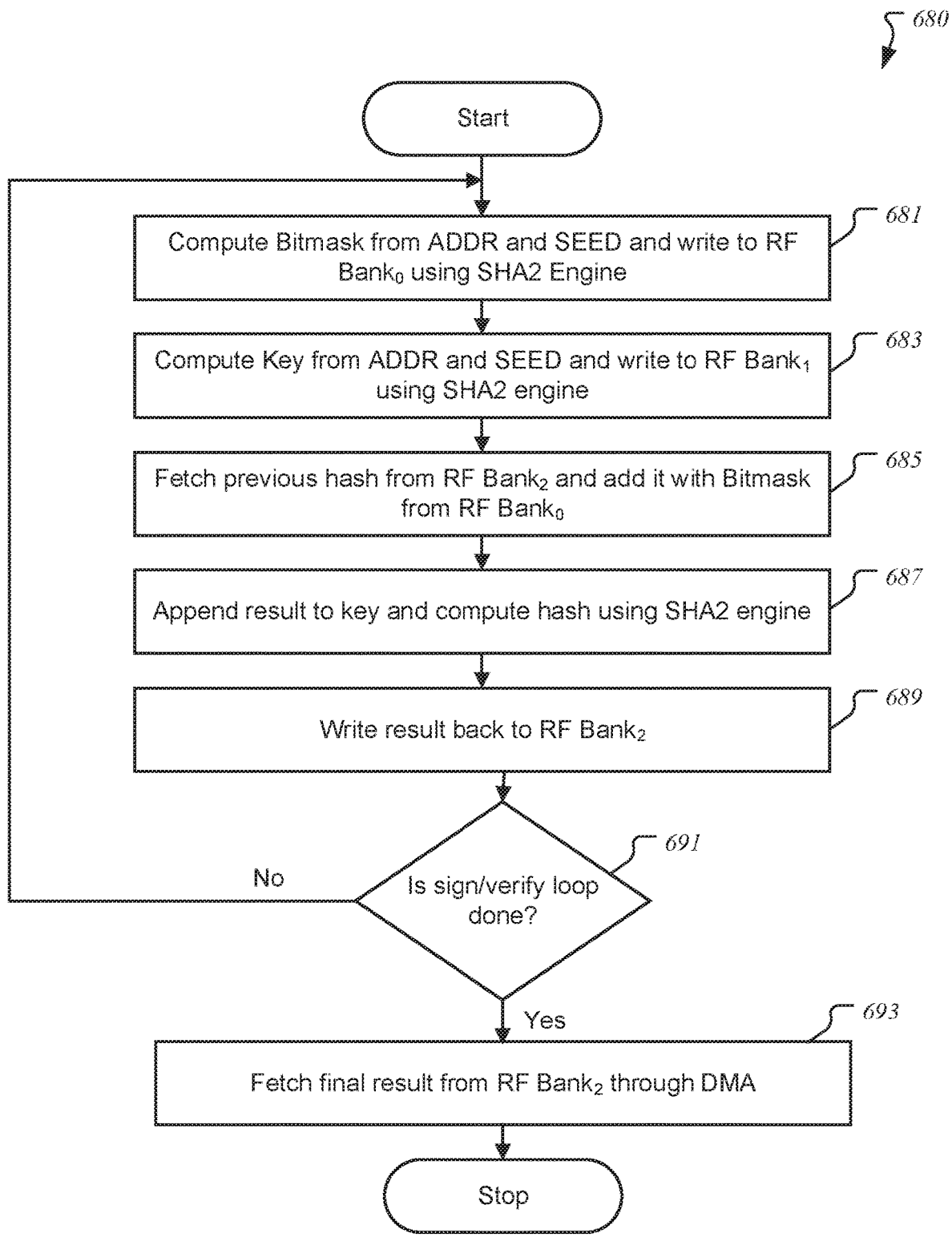
FIG. 6D illustrates a method for performing and mapping classical and post-quantum operations using a unified hardware accelerator and a unified acceleration mechanism according to one embodiment.

FIG. 6D illustrates a method 680 for performing and mapping classical and post-quantum operations using UHA 320 and unified acceleration mechanism 310 of FIG. 3 according to one embodiment. For the sake of brevity, many of the details previously mentioned or discussed with reference to FIGS. 1-6C may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by unified acceleration mechanism 110 and/or UHA 320 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As illustrated here and further with respect to FIG. 6C, method 680 begins at block 681 with hash operations at a node, such as a WOTS+ node, with computation of a bitmask from address and seed and writing of the bitmask to a bank, such as RF Bank$_0$, using a hash engine, such as SHA2 engine. At block 683, a key is computed from address and seed and written to another bank, such as RF Bank$_1$, using a hash engine, such as SHA2 engine.

At block 685, in one embodiment, method 680 continues with fetching of previous hash from RF Bank$_2$ and adding the fetched hash to bitmask from RF Bank$_0$. At block 687, any result from these operations is appended to key and compute has using a hash engine, and the result is then writing back to RF Bank$_2$ at block 689.

In one embodiment, method 680 continues at block 691 with a determination as to whether the signature and/or verification loop has been completed. If the signature/verification loop is not yet completed, method 680 loops back to the beginning at block 681 with computation and mapping of bitmask. If, however, the signature/verification loop has been completed, then method 680 continues at block 693 with fetching of the result from RF Bank$_2$ through DMA, and subsequently, method 680 ends.

FIG. 7 illustrates an embodiment of an exemplary computing architecture that may be suitable for implementing various embodiments as previously described. The embodiments may include a computing architecture including UHA 320 and unified acceleration mechanism 310, such as illustrated with respect to FIGS. 3 to 6D.

In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components of a Deep Neural Network (DNN) training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate facilitating unified accelerator for classical and post-quantum digital signature schemes in computing environments, the apparatus comprising: unify classical cryptography and post-quantum cryptography through a unified hardware accelerator hosted by a trusted platform of the computing device; and facilitate unification of a first finite state machine associated with the classical cryptography and a second finite state machine associated with the post-quantum cryptography though one or more of a single the hash engine, a set of register file banks, and a modular exponentiation engine.

Example 2 includes the subject matter of Example 1, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit.

Example 3 includes the subject matter of Examples 1-2, wherein the one or more processors are further to allow the hash engine, the set of register file banks, and the modular exponentiation engine access to a memory based on a direct memory access, wherein the hash engine comprises a secure hash algorithm (SHA) engine.

Example 4 includes the subject matter of Examples 1-3, wherein the one or more processors are further to: compute a bitmask based on an address and a seed and writing the bitmask to a first bank of the set of register file banks using the hash engine; and compute a key based on the address and the seed and writing the key to a second bank of the set of register file banks using the hash engine.

Example 5 includes the subject matter of Examples 1-4, wherein the one or more processors are further to fetch a first hash function from a third back of the set of register file banks and adding the first hash function to the bitmask in the first bank.

Example 6 includes the subject matter of Examples 1-5, wherein the one or more processors are further to: append results of the addition of the first hash function to the bitmask to the key; compute a second hash function based on the results using the hash engine; write the results to the third bank; and upon completing a signature and verification loop, fetch the results from the third bank through direct memory access.

Example 7 includes the subject matter of Examples 1-6, wherein the one or more processors include one or more of the central processing unit and a graphics processing unit, wherein the one or more processors are co-located on a common semiconductor package.

Some embodiments pertain to Example 8 that includes a method facilitating unified accelerator for classical and post-quantum digital signature schemes in computing environments, the method comprising: unifying classical cryptography and post-quantum cryptography through a unified hardware accelerator hosted by a trusted platform of the computing device; and facilitating unification of a first finite state machine associated with the classical cryptography and a second finite state machine associated with the post-quantum cryptography though one or more of a single the hash engine, a set of register file banks, and a modular exponentiation engine.

Example 9 includes the subject matter of Example 8, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit.

Example 10 includes the subject matter of Examples 8-9, further comprising allowing the hash engine, the set of register file banks, and the modular exponentiation engine access to a memory based on a direct memory access, wherein the hash engine comprises a secure hash algorithm (SHA) engine.

Example 11 includes the subject matter of Examples 8-10, further comprising: computing a bitmask based on an address and a seed and writing the bitmask to a first bank of the set of register file banks using the hash engine; and computing a key based on the address and the seed and writing the key to a second bank of the set of register file banks using the hash engine.

Example 12 includes the subject matter of Examples 8-11, further comprising fetching a first hash function from a third back of the set of register file banks and adding the first hash function to the bitmask in the first bank.

Example 13 includes the subject matter of Examples 8-12, further comprising: appending results of the addition of the first hash function to the bitmask to the key; computing a second hash function based on the results using the hash engine; writing the results to the third bank; and upon completing a signature and verification loop, fetching the results from the third bank through direct memory access.

Example 14 includes the subject matter of Examples 8-13, wherein the method is facilitated by a computing device having one or more processors including one or more of the central processing unit and a graphics processing unit, wherein the one or more processors are co-located on a common semiconductor package.

Some embodiments pertain to Example 15 that includes a data processing system comprising memory; and one or more processors coupled to the memory, the one or more processors to: unify classical cryptography and post-quantum cryptography through a unified hardware accelerator hosted by a trusted platform of the computing device; and facilitate unification of a first finite state machine associated with the classical cryptography and a second finite state machine associated with the post-quantum cryptography though one or more of a single the hash engine, a set of register file banks, and a modular exponentiation engine.

Example 16 includes the subject matter of Example 15, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit.

Example 17 includes the subject matter of Examples 15-16, wherein the one or more processors are further to allow the hash engine, the set of register file banks, and the modular exponentiation engine access to a memory based on a direct memory access, wherein the hash engine comprises a secure hash algorithm (SHA) engine.

Example 18 includes the subject matter of Examples 15-17, wherein the one or more processors are further to: compute a bitmask based on an address and a seed and writing the bitmask to a first bank of the set of register file banks using the hash engine; and compute a key based on the address and the seed and writing the key to a second bank of the set of register file banks using the hash engine.

Example 19 includes the subject matter of Examples 15-18, wherein the one or more processors are further to fetch a first hash function from a third back of the set of register file banks and adding the first hash function to the bitmask in the first bank.

Example 20 includes the subject matter of Examples 15-19, wherein the one or more processors are further to: append results of the addition of the first hash function to the bitmask to the key; compute a second hash function based on the results using the hash engine; write the results to the third bank; and upon completing a signature and verification loop, fetch the results from the third bank through direct memory access.

Example 21 includes the subject matter of Examples 15-20, wherein the one or more processors include one or more of the central processing unit and a graphics processing unit, wherein the one or more processors are co-located on a common semiconductor package.

Some embodiments pertain to Example 22 that includes an apparatus facilitating unified accelerator for classical and post-quantum digital signature schemes in computing environments, the apparatus comprising: means for unifying classical cryptography and post-quantum cryptography through a unified hardware accelerator hosted by a trusted platform of the computing device; and means for facilitating unification of a first finite state machine associated with the classical cryptography and a second finite state machine associated with the post-quantum cryptography though one or more of a single the hash engine, a set of register file banks, and a modular exponentiation engine.

Example 23 includes the subject matter of Example 22, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit.

Example 24 includes the subject matter of Examples 22-23, further comprising means for allowing the hash engine, the set of register file banks, and the modular exponentiation engine access to a memory based on a direct memory access, wherein the hash engine comprises a secure hash algorithm (SHA) engine.

Example 25 includes the subject matter of Examples 22-24, further comprising: means for computing a bitmask based on an address and a seed and writing the bitmask to a first bank of the set of register file banks using the hash engine; and means for computing a key based on the address and the seed and writing the key to a second bank of the set of register file banks using the hash engine.

Example 26 includes the subject matter of Examples 22-25, further comprising means for fetching a first hash function from a third back of the set of register file banks and adding the first hash function to the bitmask in the first bank.

Example 27 includes the subject matter of Examples 22-26, further comprising: means for appending results of the addition of the first hash function to the bitmask to the key; means for computing a second hash function based on the results using the hash engine; mans for writing the results to the third bank; and upon completing a signature and verification loop, means for fetching the results from the third bank through direct memory access.

Example 28 includes the subject matter of Examples 22-27, wherein the apparatus comprises one or more processors including one or more of the central processing unit and a graphics processing unit, wherein the one or more processors are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory machine-readable medium comprising instructions which, when executed by a computing device, cause the computing device to perform operations comprising:
    unifying classical cryptography and post-quantum cryptography through a unified hardware accelerator hosted by a trusted platform of the computing device;
    facilitating unification of a first finite state machine associated with the classical cryptography and a second finite state machine associated with the post-quantum cryptography using one or more of a hash engine, a set of register file banks, and a modular exponentiation engine, wherein the hash engine, the set of register file banks, and the module exponentiation engine are allowed direct memory access;
    computing a bitmask based on an address and a seed and writing the bitmask to a first bank of the set of register file banks using the hash engine;
    computing a key based on the address and the seed and writing the key to a second bank of the set of register file banks using the hash engine;
    fetching a first hash function from a third bank of the set of register file banks and adding the first hash function to the bitmask in the first bank; and
    appending results of the addition of the first hash function to the bitmask to the key.

2. The non-transitory machine-readable medium of claim 1, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit, wherein the hash engine comprises a secure hash algorithm (SHA) engine.

3. The non-transitory machine-readable medium of claim 1, wherein the operations further comprise:
    computing a second hash function based on the results using the hash engine;
    writing the results to the third bank; and
    upon completing a signature and verification loop, fetching the results from the third bank through direct memory access.

4. The non-transitory machine-readable medium of claim 1, wherein the computing device comprises one or more processors including one or more of an application processor and a graphics processor, wherein the one or more processors are co-located on a common semiconductor package.

5. A method comprising:
    unifying classical cryptography and post-quantum cryptography through a unified hardware accelerator hosted by a trusted platform of the computing device;
    facilitating unification of a first finite state machine associated with the classical cryptography and a second finite state machine associated with the post-quantum cryptography using one or more of a hash engine, a set of register file banks, and a modular exponentiation engine, wherein the hash engine, the set of register file banks, and the module exponentiation engine are allowed direct memory access;
    computing a bitmask based on an address and a seed and writing the bitmask to a first bank of the set of register file banks using the hash engine;
    computing a key based on the address and the seed and writing the key to a second bank of the set of register file banks using the hash engine;
    fetching a first hash function from a third bank of the set of register file banks and adding the first hash function to the bitmask in the first bank; and
    appending results of the addition of the first hash function to the bitmask to the key.

6. The method of claim 5, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit, wherein the hash engine comprises a secure hash algorithm (SHA) engine.

7. The method of claim 5, further comprising:
    computing a second hash function based on the results using the hash engine;
    writing the results to the third bank; and
    upon completing a signature and verification loop, fetching the results from the third bank through direct memory access.

8. The method of claim 5, wherein the method is facilitated by a computing device having one or more processors including one or more of an application processor or a graphics processor, wherein the one or more processors are co-located on a common semiconductor package.

9. An apparatus comprising:
    one or more processors to:
    unify classical cryptography and post-quantum cryptography through a unified hardware accelerator hosted by a trusted platform of the computing device;
    facilitate unification of a first finite state machine associated with the classical cryptography and a second finite state machine associated with the post-quantum cryptography using one or more of a hash engine, a set of register file banks, and a modular exponentiation engine, wherein the hash engine, the set of register file banks, and the module exponentiation engine are allowed direct memory access;

compute a bitmask based on an address and a seed and writing the bitmask to a first bank of the set of register file banks using the hash engine;

compute a key based on the address and the seed and writing the key to a second bank of the set of register file banks using the hash engine;

fetch a first hash function from a third bank of the set of register file banks and adding the first hash function to the bitmask in the first bank; and append results of the addition of the first hash function to the bitmask to the key.

10. The apparatus of claim 9, wherein the first finite state machine comprises a classical public key cryptography signatures (PKCS) finite state machine, and wherein the second finite state machine comprises an extended Merkel signature scheme (XMSS) finite state machine, wherein the trusted platform includes a field-programmable gate array (FPGA) platform coupled to one or more processors including a central processing unit, wherein the hash engine comprises a secure hash algorithm (SHA) engine.

11. The apparatus of claim 9, wherein the one or more processors are further to:

compute a second hash function based on the results using the hash engine;

write the results to the third bank; and upon completing a signature and verification loop, fetch the results from the third bank through direct memory access, wherein the one or more processors include one or more of the central processing unit and a graphics processing unit, wherein the one or more processors are co-located on a common semiconductor package.

* * * * *